US010635789B1

(12) United States Patent
Golden et al.

(10) Patent No.: US 10,635,789 B1
(45) Date of Patent: Apr. 28, 2020

(54) REQUEST AUTHORIZATION USING RECIPE-BASED SERVICE COORDINATION

(71) Applicant: Amazon Technologies, Inc., Seattle, WA (US)

(72) Inventors: Robin Alan Golden, Los Gatos, CA (US); Marc Andrew Bowes, Western Cape (ZA); Izak Van Der Merwe, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 146 days.

(21) Appl. No.: 15/629,594

(22) Filed: Jun. 21, 2017

(51) Int. Cl.
*H04L 29/08* (2006.01)
*G06F 9/455* (2018.01)
*G06F 21/30* (2013.01)

(52) U.S. Cl.
CPC .............. *G06F 21/30* (2013.01); *H04L 67/16* (2013.01); *G06F 9/45558* (2013.01)

(58) Field of Classification Search
None
See application file for complete search history.

(56) References Cited

U.S. PATENT DOCUMENTS

| | | | | |
|---|---|---|---|---|
| 6,826,568 B2 * | 11/2004 | Bernstein | ............... | G06F 16/86 707/749 |
| 6,976,257 B2 | 12/2005 | Leymann et al. | | |
| 7,577,554 B2 * | 8/2009 | Lystad | ............. | G06Q 10/06312 703/2 |
| 7,636,801 B1 * | 12/2009 | Kekre | ................ | H04L 67/1097 709/218 |
| 8,099,480 B1 * | 1/2012 | Muthusrinivasan | ... | G06Q 10/06 709/222 |
| 8,145,595 B2 | 3/2012 | Kloppmann et al. | | |
| 8,195,693 B2 * | 6/2012 | Syeda-Mahmood | ... | G06F 16/25 707/790 |
| 9,003,425 B2 | 4/2015 | Saha et al. | | |

(Continued)

OTHER PUBLICATIONS

Hirsch, Benjamin, et al. "A serviceware framework for designing ambient services." Developing Ambient Intelligence. Springer, Paris, 2006. 124-136. (Year: 2006).*

(Continued)

*Primary Examiner* — Matthew J Brophy
(74) *Attorney, Agent, or Firm* — Robert C. Kowert; Kowert, Hood, Munyon, Rankin & Goetzel, P.C.

(57) ABSTRACT

Methods, systems, and computer-readable media for request authorization using service coordination are disclosed. An authorization data structure and an operation data structure are selected based at least in part on a request for an operation. The authorization data structure comprises a directed acyclic graph representing a flow of data between service operations associated with authorization of the operation, and the operation data structure comprises a directed acyclic graph representing a flow of data between a service operations associated with execution of the operation. Authorization of the operation is attempted using the authorization data structure, comprising invoking one or more of the service operations associated with authorization. If the authorization is successful, then the execution of the operation is initiated using the operation data structure, comprising invoking one or more of the service operations associated with execution.

20 Claims, 16 Drawing Sheets

(56) References Cited

U.S. PATENT DOCUMENTS

| | | | |
|---|---|---|---|
| 9,262,228 B2 | 2/2016 | Bond et al. | |
| 9,367,434 B2 | 6/2016 | Taneja et al. | |
| 9,619,788 B2 | 4/2017 | Helbok et al. | |
| 9,690,546 B2* | 6/2017 | Ben Jemaa | G06F 8/10 |
| 9,910,697 B2* | 3/2018 | DeArment | G06F 9/44505 |
| 2002/0116205 A1* | 8/2002 | Ankireddipally | G06Q 20/00 705/26.1 |
| 2004/0230636 A1* | 11/2004 | Masuoka | G06F 9/451 708/800 |
| 2006/0136428 A1* | 6/2006 | Syeda-Mahmood | G06F 16/25 |
| 2008/0065455 A1* | 3/2008 | Sun | G06Q 10/06316 705/7.26 |
| 2009/0172689 A1* | 7/2009 | Bobak | G06F 9/5061 718/104 |
| 2014/0032617 A1* | 1/2014 | Stanfill | G06F 16/25 707/809 |
| 2015/0261580 A1* | 9/2015 | Shau | H04L 67/10 718/106 |
| 2015/0264119 A1* | 9/2015 | Shau | H04L 67/10 709/203 |
| 2015/0264122 A1* | 9/2015 | Shau | H04L 67/10 709/203 |
| 2015/0278395 A1* | 10/2015 | Ben Jemaa | G06F 8/10 707/756 |
| 2016/0070771 A1* | 3/2016 | Vermeulen | G06F 16/27 707/687 |
| 2017/0285981 A1* | 10/2017 | DeArment | G06F 9/44505 |
| 2017/0323089 A1* | 11/2017 | Duggal | H04W 4/00 |

OTHER PUBLICATIONS

Berrick, Stephen W., et al. "Giovanni: a web service workflow-based data visualization and analysis system." IEEE Transactions on Geoscience and Remote Sensing 47.1 (2008): 106-113. (Year: 2008).*

Jeff Barr, "Amazon EC2 Container Service (ECS)—Container Management for the AWS Cloud," Amazon.com, Nov. 2014. Retrieved from: https://aws.amazon.com/blogs/aws/cloud-container-management/, pp. 1-6.

Jeff Barr, "AWS Lambda—Run Code in the Cloud," Amazon.com, Nov. 2014. Retrieved from: https://aws.amazon.com/blogs/aws/run-code-cloud/, pp. 1-9.

Jeff Barr, "Amazon API Gateway—Build and Run Scalable Application Backends," Amazon.com, Jul. 2015. Retrieved from: https://aws.amazon.com/blogs/aws/amazon-api-gateway-build-and-run-scalable-application-backends/, pp. 1-14.

Jeff Barr, "API Gateway Update—New Features Simplify API Development," Amazon.com, Sep. 2016. Retrieved from: https://aws.amazon.com/blogs/aws/api-gateway-update-new-features-simplify-api-development/, pp. 1-11.

U.S. Appl. No. 15/629,561, filed Jun. 21, 2017, Robin Alan golden, et al.

U.S. Appl. No. 15/629,559, filed Jun. 21, 2017, Robin Alan golden, et al.

* cited by examiner

REQUEST AUTHORIZATION USING RECIPE-BASED SERVICE COORDINATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

Figure 1:
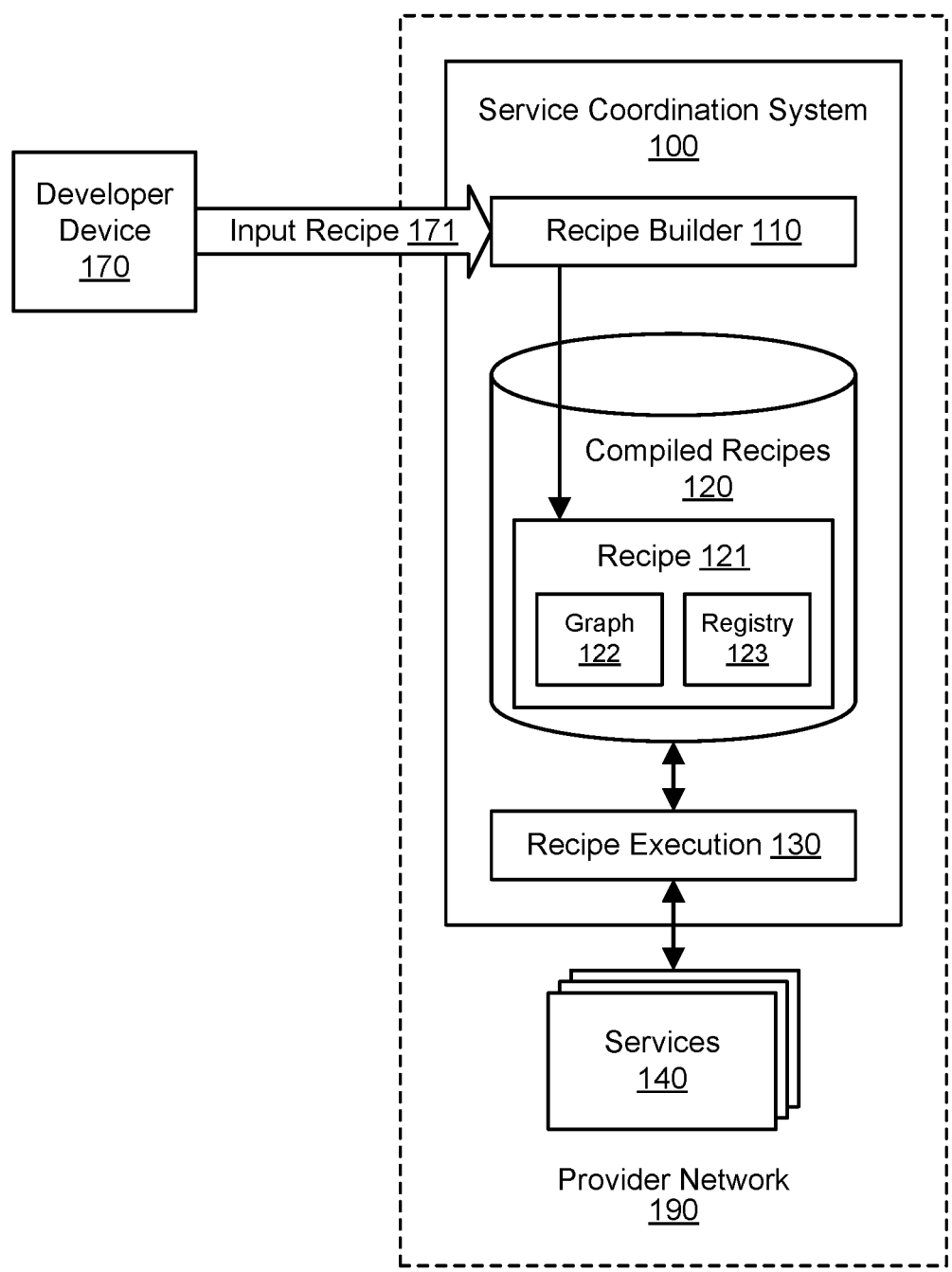
FIG. 1 illustrates an example system environment for coordination of services using recipes, including the use of a recipe builder component, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for request authorization using recipe-based service coordination are described. Using the techniques described herein, a collaborative operation may be authorized using one recipe (e.g., an authorization recipe) and then performed using another recipe (e.g., an operation recipe). Each recipe may include a directed acyclic graph of service operations linked by strongly typed fields of data, where a field represents the output of one service operation and the input to another. A recipe may be built manually or automatically, e.g., based (at least in part) on a set of service operations supplied by a developer. In one embodiment, graphs in recipes may be automatically generated based (at least in part) on identification of correspondences between input fields and output fields of different service operations. A service operation in the graph may be invoked only when its one or more inputs are ready, and so the order in which the graph is traversed may vary from request to request, dependent on the order in which services generate fields of data that are consumed by other services. The authorization recipe may represent a flow of data between service operations associated with authorizing a requested operation. For example, the service operations used for authorization may perform tasks such as describing a current state of resources and then evaluating one or more policies in light of the resource description(s). When a request for the operation is received, the request may be authenticated, and one or more policies applicable to the request may be identified (e.g., based on the identity of the user associated with the request). For example, policies may restrict read and/or write access to particular types of resources. The operation recipe may represent a flow of data between service operations associated with executing the requested operation. For example, the service operations used for execution of the operation may perform tasks such as modifying the resources associated with the request. In one embodiment, the operation recipe may be executed against the resources as described by the authorization recipe. Fields of data (e.g., in a sheet or other data structure) may be re-used from stage to stage, e.g., from authentication to authorization to execution. In this manner, loosely coupled web services may be orchestrated to authorize and then perform collaborative operations efficiently and dynamically.

Coordination of Services Using Recipes

Figure 15:
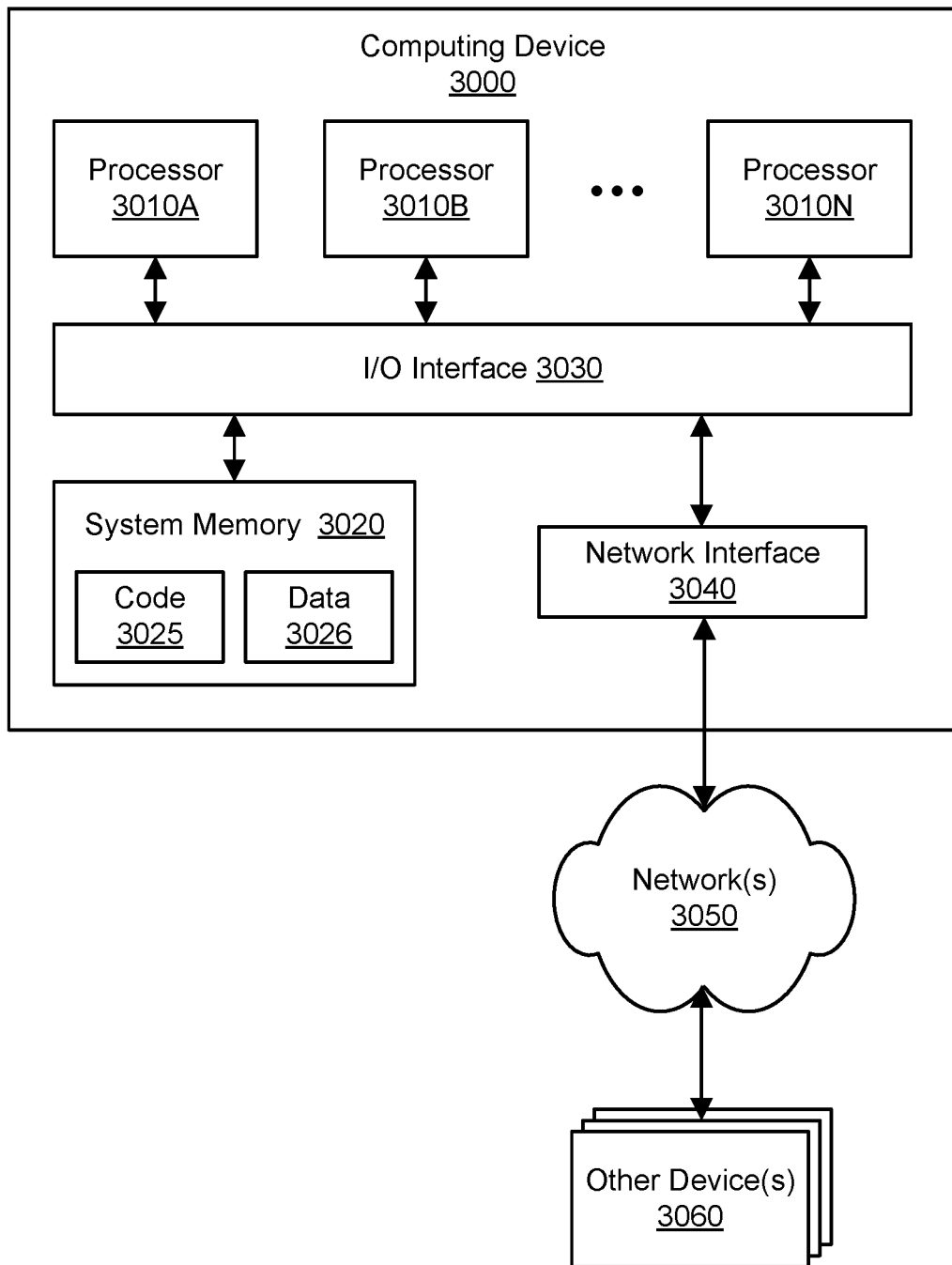
FIG. 15 illustrates an example computing device that may be used in some embodiments.

FIG. 1 illustrates an example system environment for coordination of services using recipes, including use of a recipe builder component, according to one embodiment. A service coordination system 100 may include a recipe builder component 110 for building and maintaining recipes usable to perform collaborative operations in a service-oriented system. The service coordination system 100 may also include a recipe execution component 130 for processing requests for operations based on previously generated recipes. A recipe may comprise a data structure that is usable to perform an operation by invoking other operations. To build a recipe for an operation, a developer 170 may submit an input recipe 171 to the recipe builder 110. The recipe builder 110 may analyze the input recipe 171, compile the input recipe into a compiled recipe 121, and store the compiled recipe in a repository of recipes 120. Using a computing device 170, a developer may enter suitable input using an interface to the recipe builder 110 to provide the input recipe 171. The interface may include a graphical user interface (GUI), command-line interface (CLI), voice-enabled interface, touch-enabled interface, programmatic interface (e.g., an application programming interface), or any other suitable interface. The developer device 170 may be implemented using the example computing device 3000 as shown in FIG. 15.

The input recipe 171 may indicate a set of service operations that the operation is expected to call. For example, if an application programming interface (API) requires tagging, the developer may add a "get tags" or "create tags" operation to the input recipe 171. As another example, if an API requires a volume, the developer may add a "create volume" operation to the input recipe 171. Because the new operation will invoke existing service operations that collaborate to implement a new feature, the new operation may be referred to as a collaborative operation. The input recipe 171 may specify an input model for the operation, e.g., one or more named fields and their data type(s). The input recipe 171 may specify an output model for the operation, e.g., one or more named fields and their data type(s). The input recipe 171 may further specify any manual overrides to bindings of data fields to services, such that the developer specifies which output field from one operation is bound to which input field for another operation. For example, manual overrides may be used when two services use different names for the same data fields. For example, manual bindings may be used to rename fields, change types, or explicitly order operations via shadow fields. Using shadow fields, a false shadow output field may be bound to an operation, and that shadow field may be consumed as an optional input to another, thereby causing the second operation to block until the first operation has executed. Shadow fields may be expressed in the recipe as a binding (e.g., explicit field overrides on inputs and outputs) or as a declarative statement (e.g., a second operation follows a first operation, and the compiler generates the binding).

Using these inputs, the recipe builder 110 (also referred to herein as a compiler) may compile the information in the input recipe 171 into a directed acyclic graph 122 of service operations linked by fields of data, where a field represents the output of one service operation and the input to another. The service operations may be unordered in the input recipe 171, and in generating the compiled recipe 121, the recipe builder 110 may determine an order of the flow of data between the service operations. The recipe builder 110 may analyze the operations in the input recipe to determine the typed inputs and outputs. The recipe builder 110 may then produce the directed acyclic graph of data flow between operations. The recipe builder 110 may implement a set of rules and validations that prevent loops forming in the graph. The recipe builder 110 may also implement a variety of other graph analysis rules to determine if other undesirable conditions are present and may fail the compilation process if so. Additionally, the recipe builder 110 may implement rules to determine best practices and may issue warnings if violations are detected. The graph 122 may be automatically generated based (at least in part) on service definitions (including input and output models for the various service operations) and not necessarily using specific sequences or paths between service operations as specified by the developer. The service operations may be associated with typed input fields (input data fields characterized by data types) and typed output fields (output data fields characterized by data types), and the flow of data may be determined based (at least in part) on correspondences between the typed input fields and the typed output fields of the service operations. For example, the recipe builder 110 may automatically determine that two operations are connected in the graph if one operation produces a particular field (having a particular data type) as an output and another operation consumes that same field (with the same data type) as an input. As used herein, the term "automatically" indicates that a task can be performed to completion by an automated system without additional user input (after some initial configuration stage and/or instruction to begin). The compiled recipe 121 may be used to process requests, e.g., requests from web clients for a customer-facing operation associated with the recipe.

The service operations may represent tasks performed by services 140. The services 140 may be loosely coupled and implemented according to a service-oriented architecture (SOA) in which services exchange requests and responses to perform complex operations. A system implemented according to the SOA may be referred to as a service-oriented system. In one embodiment, the services 140 may include one or more network-accessible services. The network-accessible services may accept requests (e.g., from other services) via a network (e.g., at an Internet-accessible and/or web address) and respond to the requests via the network. Functionality of the services 140 (e.g., service operations) may be requested via calls to application programming interfaces (APIs) or other programmatic interfaces. In various embodiments, the API calls may be performed over a secure proxy connection (e.g., one managed by a gateway control plane into the service and/or provider network), over a publicly accessible network (e.g., the Internet), or over a private channel such as a virtual private network (VPN) connection. The APIs may be implemented according to different technologies, including, but not limited to, Simple Object Access Protocol (SOAP) technology and Representational state transfer (REST) technology. For example, the APIs may be, but are not necessarily, implemented as SOAP APIs or RESTful APIs. SOAP represents a protocol for exchanging information in the context of network-based services. REST represents an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with a network-based data store or other system, service, component, or device.

In some prior approaches to maintaining service-oriented systems, a single team or small number of individuals may be tasked with testing and approving new operations or changes to existing operations (e.g., in order to ensure that the operations do not cause errors with existing operations). As a service-oriented system grows in size and complexity, those individuals responsible for testing and approval may begin to pose a bottleneck, such that new features may not be added to the service-oriented system without a significant delay. Additionally, using the prior approaches, coordination among services may be implemented in a complex and manual way. Using the service coordination system 100, developers may rapidly and efficiently add new features to a service-oriented system using recipes 120. In one embodiment, new or changed operations may be added to the service-oriented system via the recipe builder component 110 without a requirement for manual approval by another developer or team. Using the recipe execution component 130, requests for recipe-based operations may often be processed within milliseconds.

A service operation may be associated with one or more required inputs, optional inputs, and/or one or more optional outputs. Inputs and outputs may be strongly typed. A service operation may be associated with a resource name or other identifier that uniquely identifies the operation within some context (e.g., a service-oriented system). In one embodiment, the combination of inputs, outputs, and resource name may be hashed to indicate a version of the corresponding service operation. A compiled recipe 121 may represent a directed acyclic graph 122 of possible paths through the service operations in the input recipe. In the graph 122, nodes may represent service operations and fields of data.

In one embodiment, a recipe 121 may include a graph 122 and a registry 123. As discussed above, the graph 122 may connect service operations to fields, e.g., to control which services are invoked by the recipe execution component. The registry 123 may include instructions and metadata for invoking service calls, e.g., to control where and how services are invoked. In various embodiments, the registry 123 may store information such as what endpoint to send input data for a service operation, how many connections to open to the endpoint, security parameters (e.g., Secure Sockets Layer information, authorization information, certifications, and so on), whether to do client-side load balancing, how many connections to open per-host for client-side load balancing, the timeout duration, whether to retry and with what strategy, and so on. The identifier for a recipe 121 may be generated as a secure hash of both the graph 122 and the registry 123. In one embodiment, if the service-oriented system includes multiple independent regions (e.g., regions dictated by political and/or geographical boundaries), then the same recipe may have registry information for the different regions.

In one embodiment, the recipe builder component 110 may support changes to recipes 120. Changes submitted by a developer 170 for an existing recipe may include new or different service operations, new or different inputs or outputs, new registry parameters such as service timeouts, and so on. In one embodiment, any such change may result in compilation of a new and immutable recipe. A new recipe may be tested by directing only a limited amount of request traffic to it. In one embodiment, the recipe to be used for a request may be passed via the headers, e.g., with the parameter recipe=RECIPE_ID. In one embodiment, a recipe may be automatically updated when any of its underlying service operations are changed. In one embodiment, the recipe builder 110 may obtain changes to underlying service operations, determine the compiled recipes that are potentially affected, and recompile the recipes to account for the changes in the service operations.

The service coordination system 100 may be implemented using one or more computing devices referred to as instances. Any of the instances may be implemented using the example computing device 3000 as shown in FIG. 15. In various embodiments, portions of the described functionality of the service coordination system 100 may be provided by the same computing device or by any suitable number of different computing devices. If any of the components of the service coordination system 100 are implemented using different computing devices, then the components and their respective computing devices may be communicatively coupled, e.g., via a network. Each of the illustrated components may represent any combination of software and hardware usable to perform their respective functions. It is contemplated that the service coordination system 100 may include additional components not shown, fewer components than shown, or different combinations, configurations, or quantities of the components shown.

Any of the services 140 may be implemented using one or more computing devices, such as the example computing device 3000 illustrated in FIG. 15. The services 140 may be communicatively coupled to the service coordination system 100 via one or more public and/or private networks. In one embodiment, the services 140 and/or service coordination system 100 may convey network-based service requests and responses to each other via the one or more networks. In various embodiments, the network(s) may encompass any suitable combination of networking hardware and protocols necessary to establish network-based communications between the services 140 and the service coordination system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, the services 140 and the service coordination system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between a service and the Internet as well as between the Internet and the service coordination system 100. It is noted that in some embodiments, the services 140 may communicate with the service coordination system 100 using a private network rather than the public Internet.

The service coordination system 100 and/or services 140 may be implemented using resources of a provider network 190. The provider network 190 may include a network set up by an entity such as a business or a public-sector organization to provide one or more services and/or resources (such as various types of network-accessible computing or storage) accessible via the Internet and/or other networks to a distributed set of clients. The provider network 190 may include a plurality of services whose functionality may be invoked on behalf of clients. For example, the provider network 190 may offer one or more computing virtualization services for hosting virtual compute instances or desktops, one or more storage virtualization services for offering various types of storage to clients, and other suitable types of functionality. The various services of the provider network 190 may be integrated via service interfaces. For example, one service may invoke the functionality of another service using a request sent via an application programming interface (API) associated with the called service. The called service may then perform one or more tasks based (at least in part) on the API call and potentially return a response to the calling service. In this manner, services may be chained together in a hierarchy to perform complex tasks. In some embodiments, the services may be configured to generate network-based service requests according to a Representational State Transfer (REST)-style network-based services architecture, a document- or message-based network-based services architecture, or another suitable network-based services architecture. In at least some embodiments, the services may provision, mount, and configure storage volumes implemented at storage services within the provider network. Because one or more of the services may be used by (or invoked on behalf of) a plurality of clients at any given time (using one or more instances of the service), the provider network 190 may offer multi-tenancy and may be referred to as a multi-tenant provider network.

The provider network 190 may include a plurality of resources that are offered to clients. The resources of the provider network 190 may include compute instances, storage instances, and so on. The provider network 190 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 190 in different embodiments, including general purpose or special purpose computer servers, storage devices, network devices, and the like. Because resources of the provider network 190 may be under the control of multiple clients (or tenants) simultaneously, the provider network may be said to offer multi-tenancy and may be termed a multi-tenant provider network. The provider network 190 may include additional components not shown, fewer components than shown, or different combinations, configurations, or quantities of the components shown.

The resources offered by the provider network 190 may vary in their respective configurations. The configuration of a computing resource may include its instance type, hardware capabilities (e.g., type and number of processor cores, type and number of virtual CPUs, type and amount of memory and storage, presence or absence of specialized coprocessors such as a graphics processing unit (GPU), presence or absence of particular application-specific integrated circuits (ASICs) or field-programmable gate arrays (FPGAs), and so on), software configuration (e.g., operating system type and configuration, application type and configuration, and so on), and/or other suitable characteristics.

For example, the provider network 190 may include a set of compute instances (physical compute instances and/or virtual compute instances) of different compute instance types, where the compute instance types may vary in the capabilities and features of their processor resources, memory resources, storage resources, network resources, and so on, and potentially in their cost to clients as well. The configuration of a computing resource may impact the performance of that resource for executing a particular task, such that resources having different configurations may vary in performance (e.g., processor performance, execution time, memory usage, storage usage, network usage, energy usage, and so on) for the same or similar tasks. The resources offered by the provider network 190 may also vary in their respective costs that are assessed to clients for reserving and/or using the resources. In one embodiment, the costs may vary by hardware configuration as well as by purchasing mode. Additionally, the resources offered by the provider network 190 may vary in their availability at particular times.

In some embodiments, an operator of the provider network 190 may implement a flexible set of resource reservation, control, and access interfaces for clients. For example, a resource manager associated with the provider network 190 may implement a programmatic resource reservation interface (e.g., via a web site or a set of web pages) that allows clients and/or internal components to learn about, select, purchase access to, and/or reserve resources (e.g., compute instances) offered by the provider network 190. Such an interface may include capabilities to allow browsing of a resource catalog and provide details and specifications of the different types or sizes of resources supported, the different reservation types or modes supported, pricing models, and so on. The provider network 190 may support several different purchasing modes (which may also be referred to herein as reservation modes) in various embodiments: for example, long-term reservations, on-demand resource allocation, or spot-price-based resource allocation.

Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: e.g., a resource instance that was previously allocated to the client may be reclaimed by the resource manager and may be allocated to some other client that is willing to pay a higher price. Other purchasing modes or combinations of modes may be implemented by the resource manager in some embodiments.

Figure 2A:
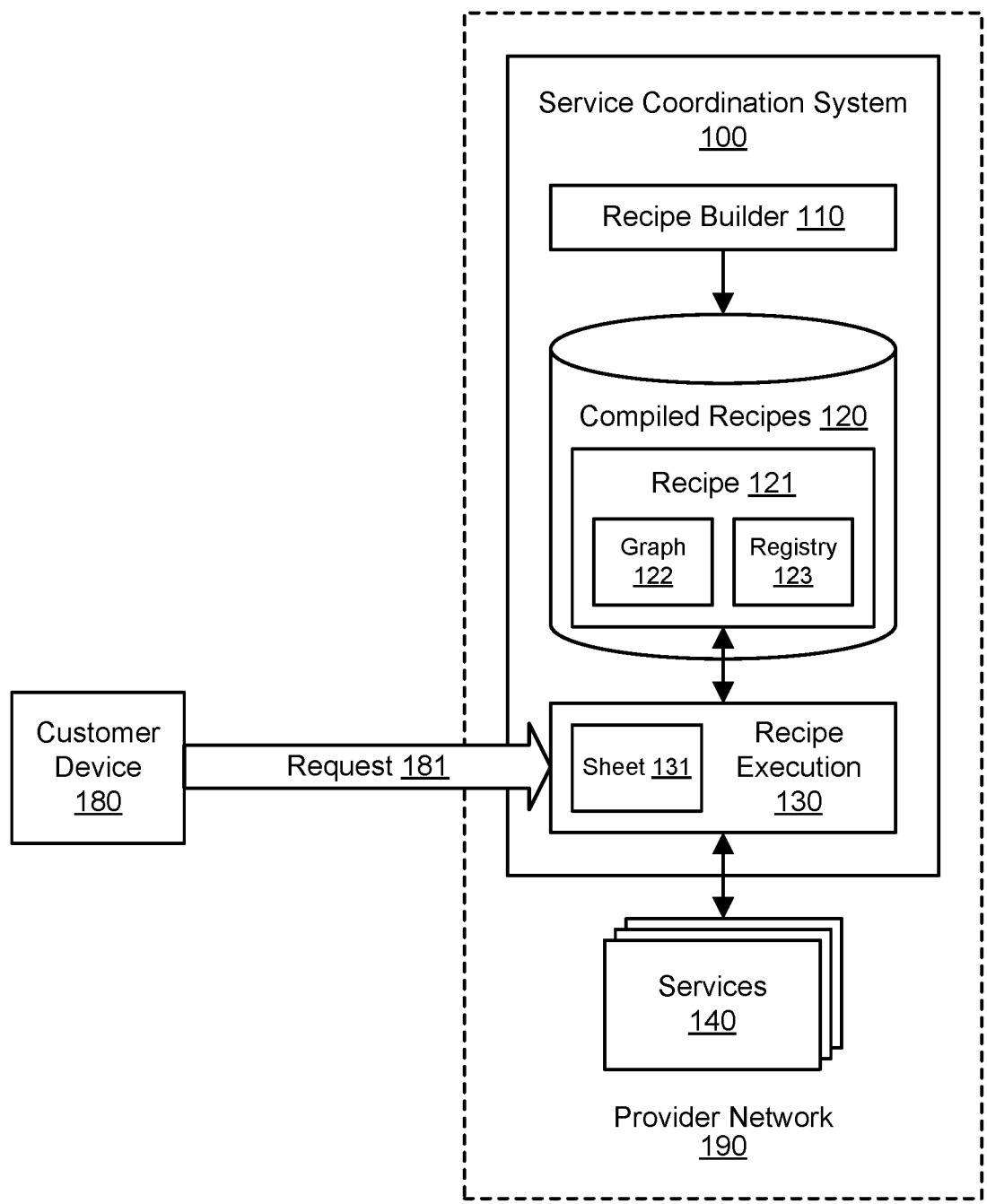
FIG. 2A and FIG. 2B illustrate further aspects of the example system environment for coordination of services using recipes, including the use of a recipe execution component, according to one embodiment.
Figure 2B:
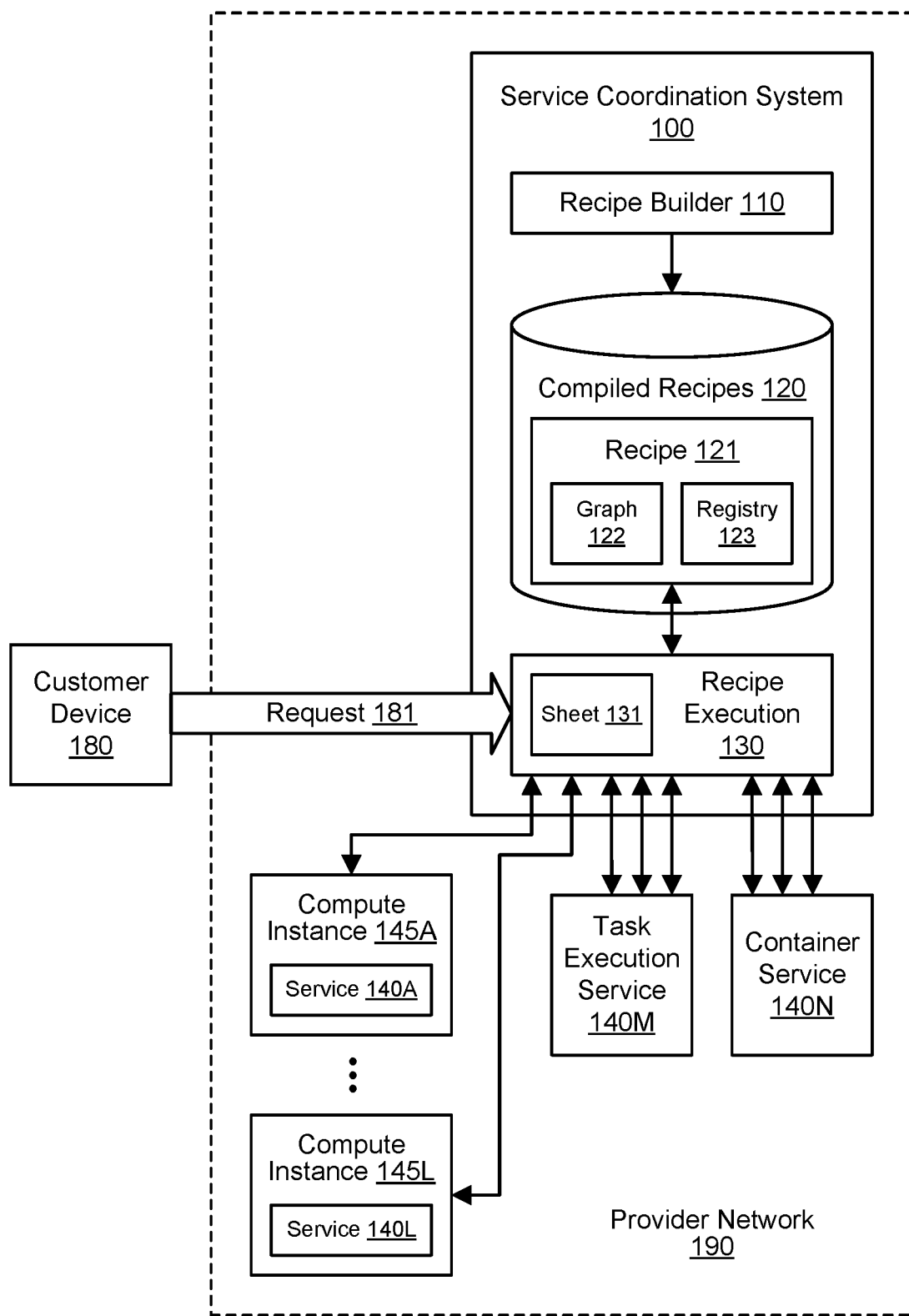

FIG. 2A and FIG. 2B illustrate further aspects of the example system environment for coordination of services using recipes, including the use of a recipe execution component, according to one embodiment. The recipe execution component 130 may also be referred to as a runtime component, and tasks performed by the recipe execution component in the processing of a request 181 may be referred to as taking place at runtime. Using a computing device 180, a customer of the provider network 190 may provide a request 181 for the operation associated with the recipe 121. The operation may be termed a customer-facing operation such that customers of the provider network 190 may request the operation. The customer may represent an internal user of the provider network 190 (including the services 140) or an entity external to the provider network. The customer device 180 may be implemented using the example computing device 3000 as shown in FIG. 15. The request 181 may be provided to the service coordination system 100 via one or more networks, as discussed above with respect to FIG. 1. For example, the request 181 may be received by a component of the provider network 190 in the form of a uniform resource locator (URL) sent by a web browser. The request 181 may be received from the customer 180 and forwarded to the recipe execution component 130 by one or more other components associated with the provider network 190, e.g., one or more web servers, proxies, load balancers, and so on.

In one embodiment, a sheet 131 of data may be used in the processing of a given request 181. In one embodiment, a sheet is a data structure that includes fields of data that can be filled by service operations. The sheet 131 may represent the progress of the request 181. In one embodiment, a sheet may be ephemeral and may be discarded after the processing of the request is complete. The service coordination system 100 may store (temporarily, in memory) the sheet 131 representing the customer's request and its progress, and the service coordination system 100 may allow for annotation of request metadata (e.g., properties, resource identifiers, capacity instructions, placement data, and so on) that independent services may require in order to fulfill their portion of a request. As the request is processed, services may write additional fields to the sheet. The recipe execution component 130 may provide an abstract data access and update API so that called services can modify sheets. In one embodiment, default metadata may be added to a sheet such as encrypted fabric-attached storage, user-agent, credential store properties, source IPs, API version, endpoints, request-id, and so on.

When the request 181 for the operation is received, a compiled recipe 121 associated with the requested operation may be selected, e.g., by the recipe execution component 130. In one embodiment, two or more recipes associated with the same request may be deployed simultaneously, and a selection of one of the recipes may be performed at runtime when a request is received. Different recipes may be linked to different customers, different regions, different compute environments (e.g., a production environment vs. a test environment), and so on. In one embodiment, the recipe 121 may be selected based (at least in part) on the identity of the customer 180. In one embodiment, the recipe 121 may be selected based (at least in part) on one or more traits of the customer 180 and/or request 181, such as the geographical location of the customer. In one embodiment, the recipe 121 may be selected based (at least in part) on a recipe identifier specified with the request 181 (e.g., as a parameter in a uniform resource locator (URL) representing the request), e.g., to override any other basis for selecting the recipe. In one embodiment, the same recipe 121 may be used for all or nearly all requests for the corresponding operation, e.g., unless a different recipe is specified with the request.

The execution order in which service operations in the recipe 121 are invoked may be determined at runtime. A service operation in the graph 122 may be invoked only when its one or more inputs are ready, and so the order in which the graph is traversed may vary from request to request, dependent on the order in which services generate fields of data that are consumed by other services. Service operations may fill fields of data in a sheet, and the sheet may be discarded after the request processing is complete.

In one embodiment, some service calls may be delayed until a predetermined duration of time has passed since another service call was made. The delays may be implemented at runtime. In one embodiment, a delay in a service call may be made to mitigate the chances of doing unnecessary work if another service call fails. In one embodiment, a delay in a service call may be made so that the outputs of two or more service operations are generated closer in time to one another. In one embodiment, metrics concerning service response times may be used to implement the delays. In one embodiment, metrics concerning service failure rates may be used to implement the delays. In many circumstances, services that fail tend to fail rapidly, so service call delays may need only exceed the typical duration of such a failed call in order to prevent unnecessary calls to other services. The metrics used to implement service call delays may be maintained globally in the service coordination system 100 (e.g., using an external repository) or may instead be local to each instance that implements recipe execution 130.

In one embodiment, the recipe execution component 130 may support idempotency such that repeated requests with the same input do not generate different results. To implement idempotency, the recipe execution component 130 may re-drive calls to services until they succeed. If a call fails or no more forward progress is being made, the recipe execution component may mark a sheet as failed (e.g., an error code such as server-unavailable) and respond accordingly to the customer. In one embodiment, the recipe execution component 130 may support rollback of failed requests, e.g., using checkpointing of some fields within a sheet. In one embodiment, a rollback agent may persist rollback documents and then inject those rollback documents as new sheets after some time interval.

As shown in FIG. 2A, the recipe execution component 130 may invoke various services 140 based on traversal of the graph 122 during the processing of the request 181. As shown in FIG. 2B, the services 140 may include various types of services such as services 140A through 140L, service 140M, and service 140N. The various services may be implemented in different ways in the provider network 190. For example, each instance of services 140A through 140L may be implemented using a corresponding compute instance, such as instances 145A through 145L. These instances 145A-145L may represent endpoints that can be contacted by the recipe execution component 130 to invoke operations offered by the resident services. In one embodiment, the services 140A-140L may be accessible via load balancers. The recipe execution may also make one or more calls to a task execution service 140M, such as Amazon Lambda, that offers a "serverless" compute platform in which compute resources are managed internally by the service itself for execution of tasks supplied by clients (including the recipe execution component 130). The task execution service 140M may be used to implement one or more service operations that are invoked by the recipe execution component 130. Additionally, the recipe execution may also make one or more calls to a container service 140N, such as Amazon EC2 Container Service (ECS), that offers API-based launching of containerized applications on a managed cluster of virtual compute instances in the provider network 190. The container service 140N may be used to implement one or more service operations that are invoked by the recipe execution component 130.

In some circumstances, the sheet may be held in memory on a temporary basis and may be discarded shortly after the processing of the request has completed. In other circumstances, the sheet may be transferred to persistent storage for later review and analysis. If the execution of the operation failed, then the sheet (including any fields generated throughout the processing of the corresponding request) may be made available to a suitable developer. The sheet (or portions thereof) may be sent to the developer, or the developer may be granted access to the sheet in a management console associated with the service coordination system 100 or provider network 190. The developer may be associated with the recipe. Using the sheet, the developer may perform debugging or failure analysis of the failed execution. For example, the developer may use the contents of fields in the sheet to ascertain that one or more service calls failed to produce output in the sheet, that the recipe itself was improperly constructed, that the execution was halted by a network failure, and so on. In one embodiment, the developer may modify the recipe based on such analysis.

Figure 3:
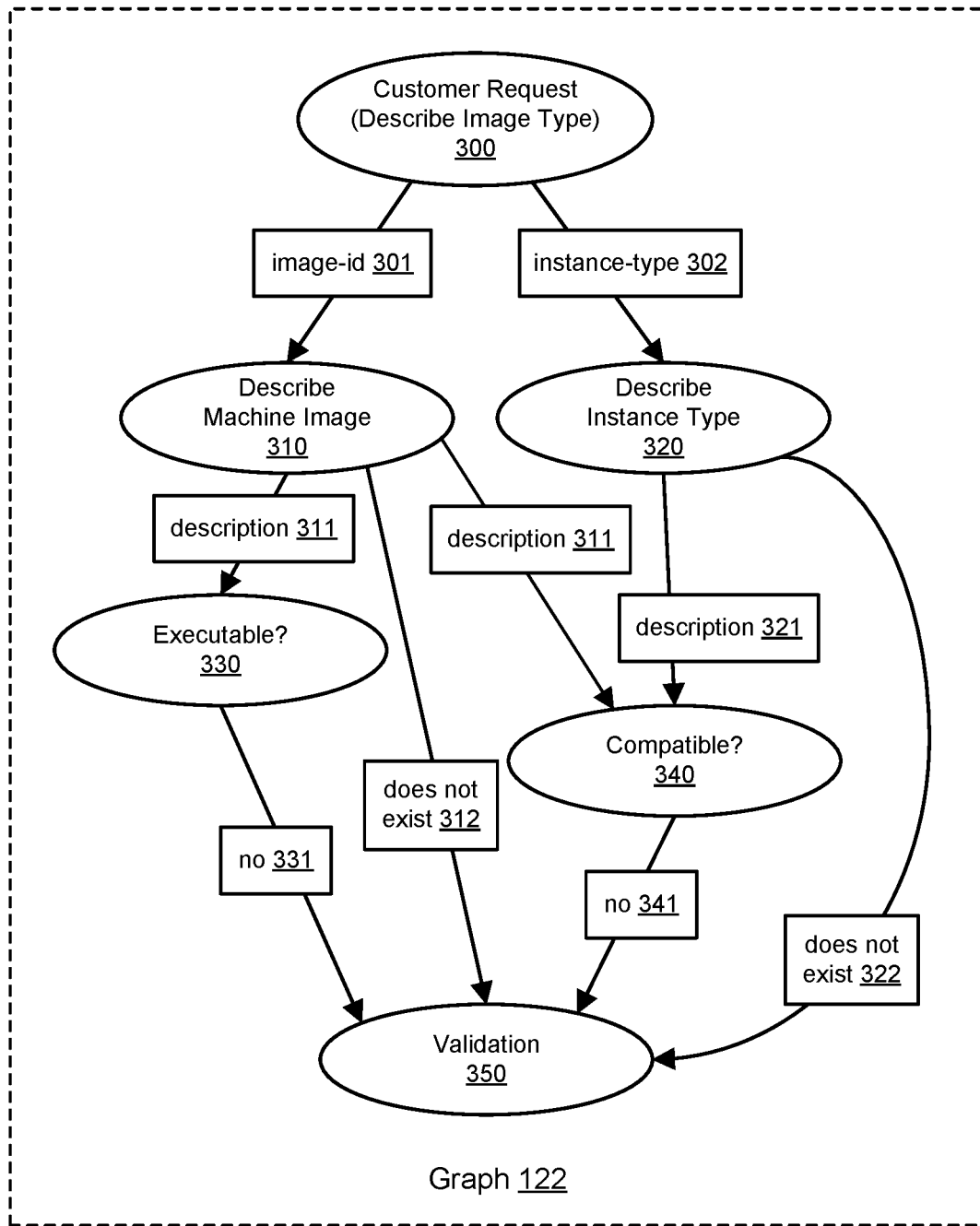
FIG. 3 illustrates an example of a directed acyclic graph usable with the example system environment for coordination of services using recipes, according to one embodiment.

FIG. 3 illustrates an example of a directed acyclic graph usable with the example system environment for coordination of services using recipes, according to one embodiment. The ovals in the example graph 122 represent nodes that correspond to service operations and data fields. The service operations may be indicated in the input recipe 171, and the flow of data from operation to operation may be determined based (at least in part) on automated analysis of fields. In one embodiment, an order of execution of the service operations may not be indicated in the input recipe 171, and the service operations may be automatically arranged by the recipe builder 110 in the various paths as shown in the graph 122. For example, the recipe builder 110 may automatically determine that two operations are connected in the graph if one operation produces a particular field as an output and another operation consumes that same field as an input. The flow of data in the graph 122 may represent one or more potential execution orders; an actual execution order may be determined for a particular request at runtime. The arrangement of the nodes in the graph 122 may be determined based (at least in part) on analysis of the inputs and outputs of the corresponding service operations. For example, if one service operation produces a particular field and another service operation consumes that field, then the recipe builder 110 may create an edge in the graph between the two operations. The developer 170 may specify manual overrides to such bindings.

The field nodes in the example graph 122 (e.g., fields 301, 302, 311, 312, 321, 322, 331, and 341) may correspond to the fields in a sheet for the request. In the example graph 122, the top-level node 300 may represent an incoming customer request, such as request for an operation to describe an image type. The node 300 may provide the fields image-id 301 and instance-type 302 to other service operations that are invoked by the service coordination system 100. The service operation to describe a machine image may take the image-id field 301 as input. The service operation to describe an instance type may take the instance-type field 302 as input. The describe machine image operation 310 may produce a description field 311 as input to a service operation 330 that determines whether it the machine image is executable. The describe machine image operation 310 may also provide the description field 311 as input to a service operation 340 that determines whether it the machine image is compatible. The describe instance type operation 320 may produce its own description field 321 as input to the service operation 340 that determines whether it is compatible. If the machine image does not exist, the service operation 310 may provide such an indication 312 to a validation operation 350. Similarly, if the instance type does not exist, the service operation 320 may provide such an indication 322 to the validation operation 350. If the machine image is not executable, then the operation 330 may provide such an indication 331 to the validation operation 350. If the machine image or instance type is not compatible, then the operation 330 may provide such an indication 341 to the validation operation 350.

Accordingly, in the example graph 122, the operation 340 may take input fields from two upstream service operations 310 and 320. From request to request, the operations 310 and 320 may vary in terms of how long they take to complete and when they produce their respective output fields. The order in which nodes of the graph 122 are traversed may vary from request to request, and the execution order may be determined at runtime based on the graph itself 122 but also based on the order in which fields become available. For example, in some cases the service operation 330 may be invoked while the service operation 340 remains waiting for the description 321 produced by the service operation 320. In other cases, when the description 321 is ready before the description 311, the service operation 340 may be invoked before or around the same time as the service operation 330. Different paths in the graph 122 may also be traversed in parallel. By traversing the graph 122 based (at least in part) on which inputs are available, the service coordination system 100 may provide both speed and flexibility for orchestrating existing service operations into a collaborative operation.

Figure 4:
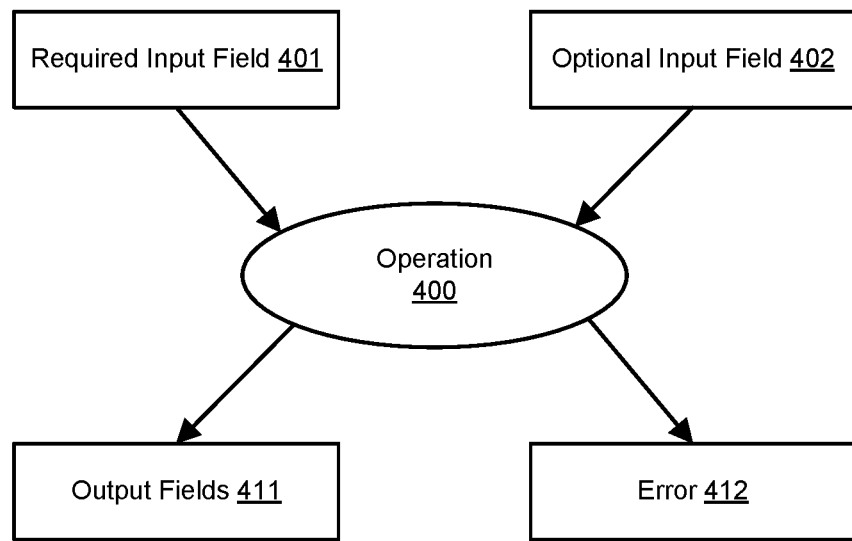
FIG. 4 illustrates an example of an operation flow for coordination of services using recipes, according to one embodiment.

FIG. 4 illustrates an example of an operation flow for coordination of services using recipes, according to one embodiment. As specified in its recipe, an operation 400 may consume one or more required input fields, such as required input field 401. As specified in its recipe, the operation 400 may consume one or more optional input fields, such as optional input field 402. As further specified in its recipe, the operation 400 may produce one or more output fields, such as output fields 411. The input fields 401 and 402 and output fields 411 may be strongly typed, with data types specified by the developer as part of the recipe. The operation 400 may also be capable of producing an error 412 instead of the output fields 411, e.g., if the outputs 411 cannot be produced due to an error or unavailability of any of the service operations invoked by the operation 400.

Figure 5:
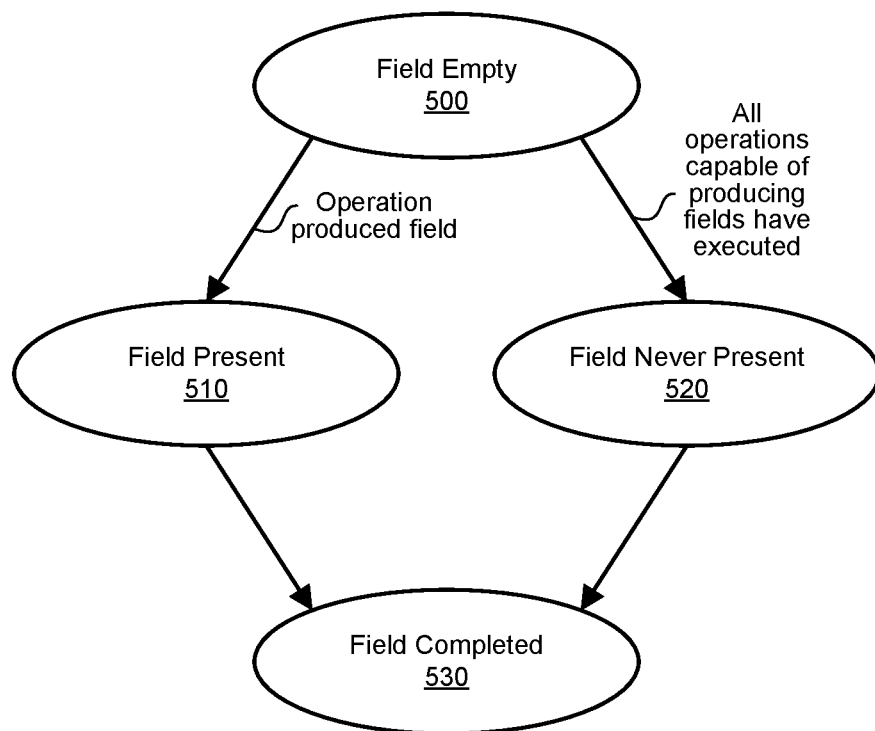
FIG. 5 illustrates an example of field states for coordination of services using recipes, according to one embodiment.

FIG. 5 is a state diagram illustrating an example of field states for coordination of services using recipes, according to one embodiment. A first state 500 in the state diagram may represent a field being empty. If an operation produced a field, the state diagram may transition to another state 510 in which the field is present. If all operations capable of producing fields have executed, then the state diagram may transition to another state 520 in which a field was never present. From states 510 and 520, the state diagram may transition to another state 530 in which the field has been completed.

Figure 6:
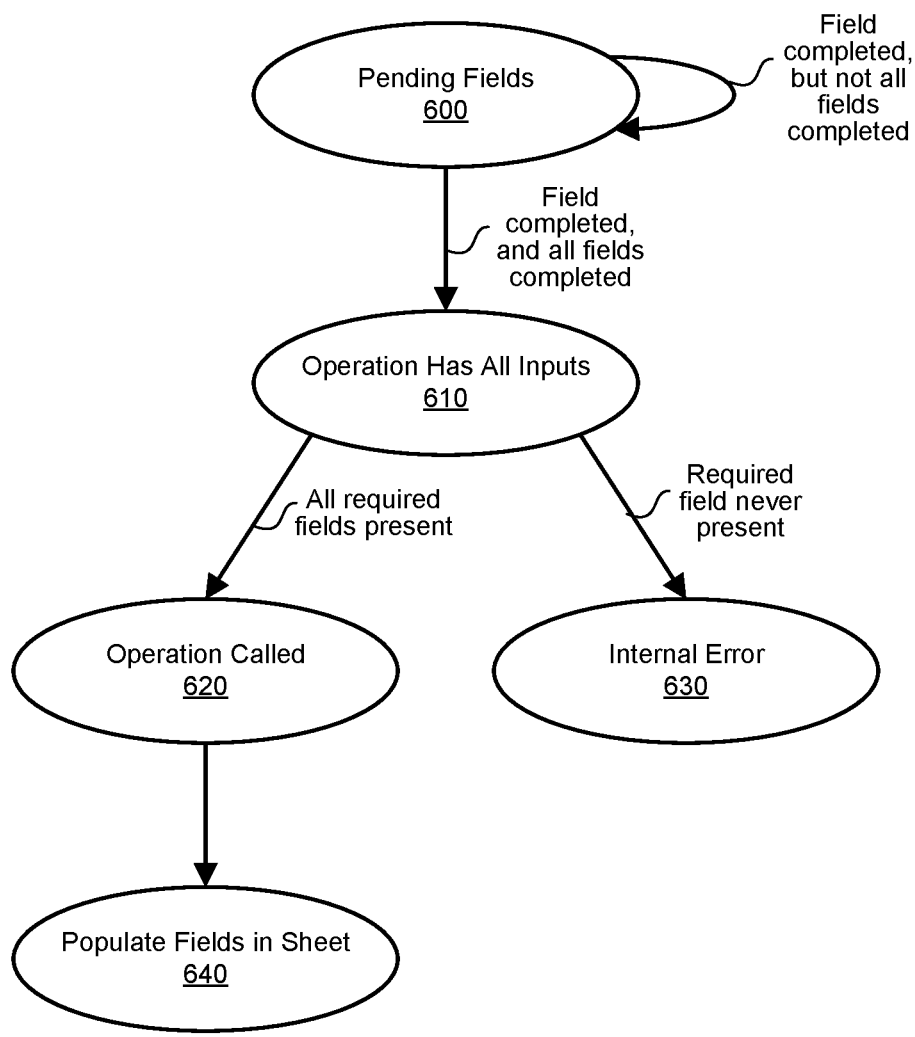
FIG. 6 illustrates an example of operation states for coordination of services using recipes, according to one embodiment.

FIG. 6 is a state diagram illustrating an example of operation states for coordination of services using recipes, according to one embodiment. In a first state 600, fields of data representing inputs to an operation may be incomplete. When one field is completed but not all of the fields have been completed, the state diagram may remain in the pending fields state 600. When the last field has been completed, the state diagram may transition to another state 610 in which the operation has all inputs (e.g., required inputs and/or optional inputs). If a required field is not present, then the state diagram may transition to a state 630 representing an internal error. If all required fields are present, the state diagram may transition to another state 620 in which the operation has been called (with the inputs). The flow diagram may then transition to a state 640 in which fields in the sheet are populated, e.g., by the service operation that was invoked in the state 620.

Figure 7:
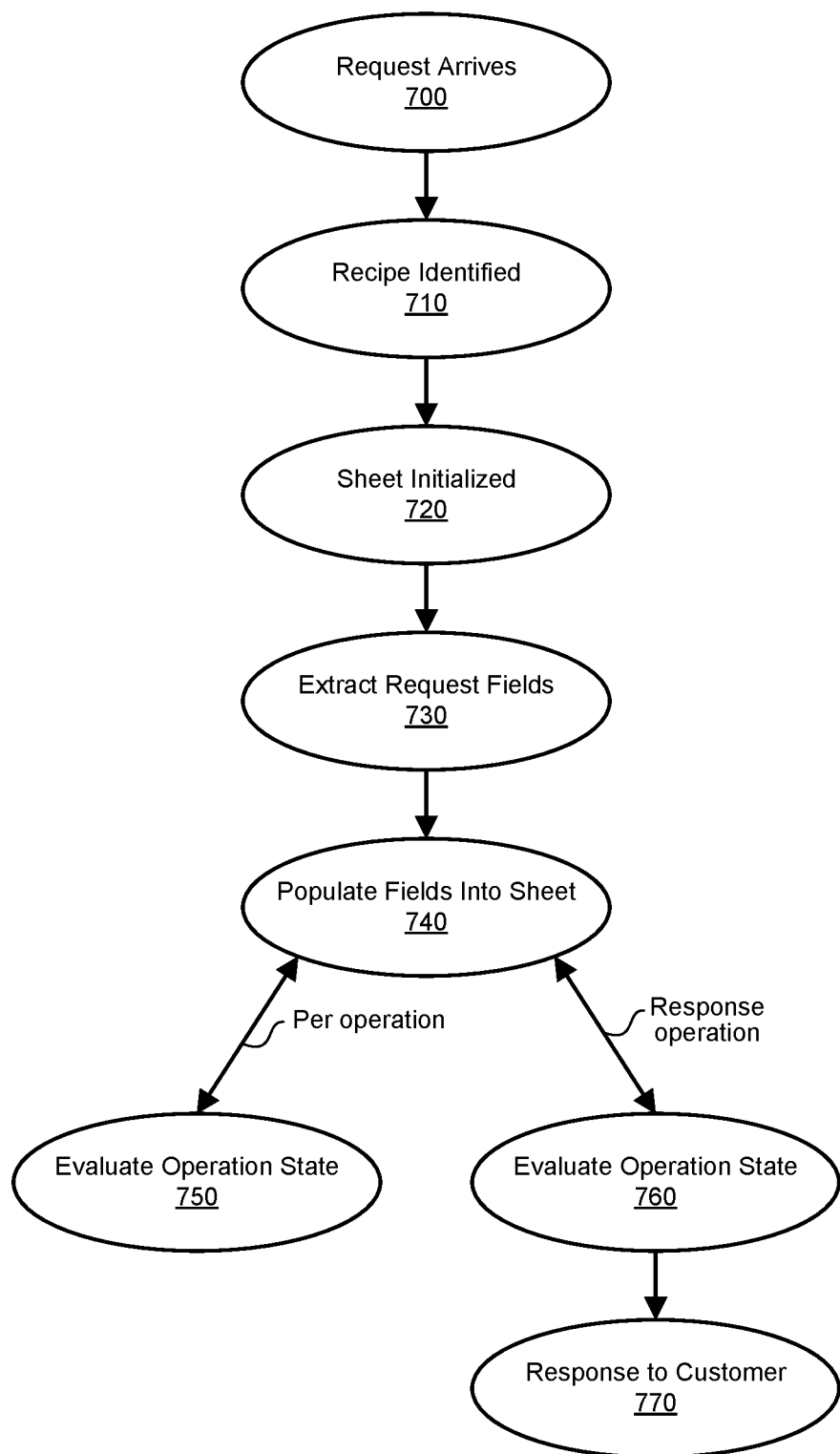
FIG. 7 illustrates an example flow of request processing for coordination of services using recipes, according to one embodiment.

FIG. 7 is a state diagram illustrating an example of request processing for coordination of services using recipes, according to one embodiment. In a first state 700, a request for an operation arrives. The operation may represent a customer-facing operation and may be received from a customer by the service coordination system 100. In a next state 710, the appropriate recipe for processing the request is identified. In one embodiment, the recipe may be selected based (at least in part) on the identity of the customer. In one embodiment, the recipe may be selected based (at least in part) on one or more traits of the customer and/or request, such as the geographical location of the customer. In one embodiment, the recipe may be selected based (at least in part) on a recipe identifier specified with the request (e.g., as a parameter in a uniform resource locator (URL) representing the request), e.g., to override any other basis for selecting the recipe. In a next state 720, the sheet for the request is initialized. In a next state 730, request fields are extracted. In a next state 740, fields in the sheet are populated. For each operation, the operation state is evaluated as indicated in state 750. For a response operation, the operation state is also evaluated as indicated in state 760. As indicated in state 770, a response is returned to the customer.

Figure 8:
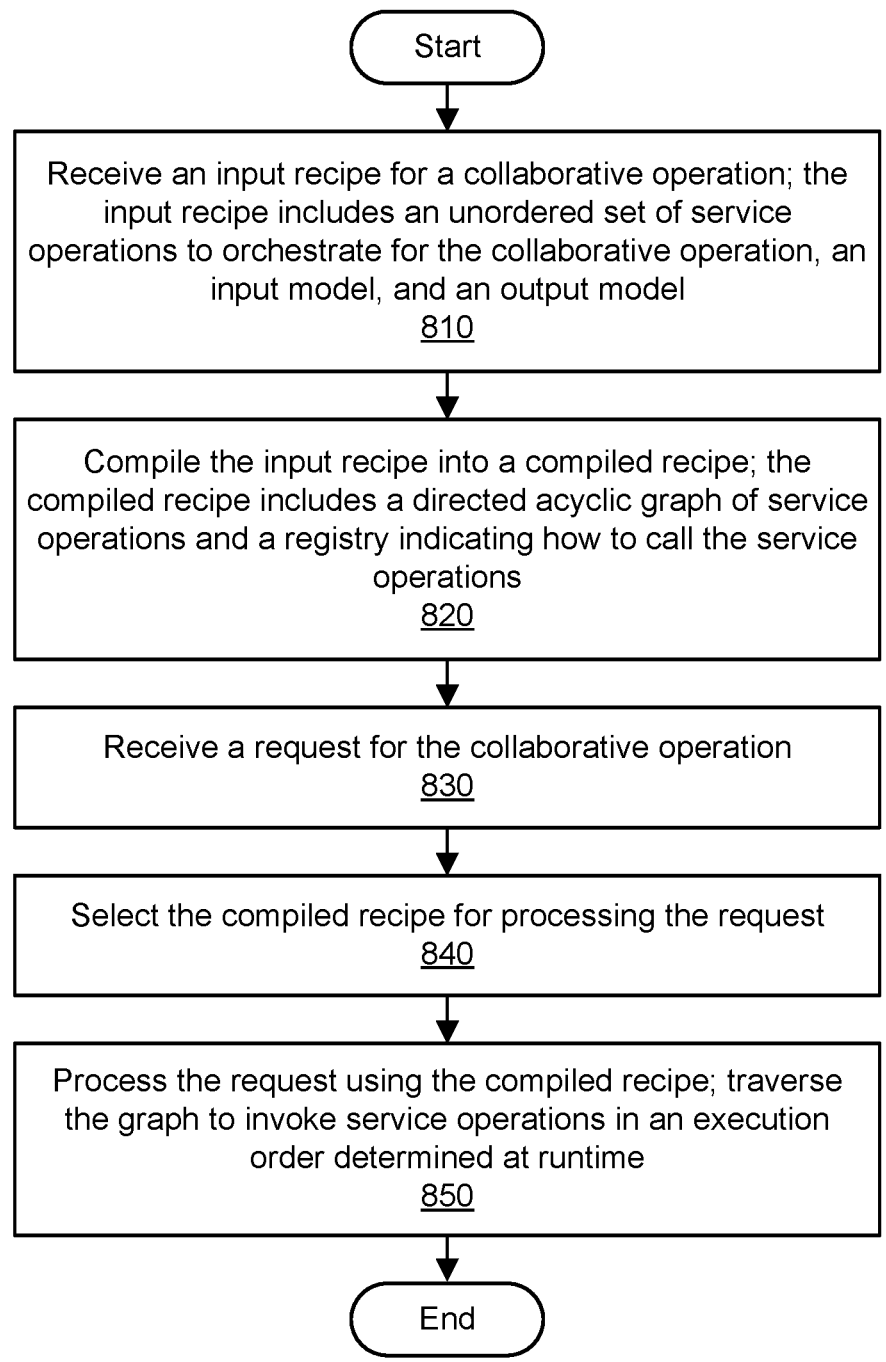
FIG. 8 is a flowchart illustrating a method for coordination of services using recipes, according to one embodiment.

FIG. 8 is a flowchart illustrating a method for coordination of services using recipes, according to one embodiment. As shown in 810, an input recipe may be received, e.g., at a recipe builder from a developer. The input recipe may describe aspects of a collaborative operation to be performed in a provider network and/or service-oriented system. The input recipe may indicate a set of service operations that the operation is expected to call. The input recipe may specify an input model for the operation, e.g., one or more named fields and their data type(s). The input recipe may specify an output model for the operation, e.g., one or more named fields and their data type(s). The input recipe may further specify any manual overrides to bindings of data fields to services. For example, manual bindings may be used to rename fields, change types, or explicitly order operations via shadow fields. Using shadow fields, a false shadow output field may be bound to an operation, and that shadow field may be consumed as an optional input to another, thereby causing the second operation to block until the first operation has executed. Shadow fields may be expressed in the recipe as a binding (e.g., explicit field overrides on inputs and outputs) or as a declarative statement (e.g., a second operation follows a first operation, and the compiler generates the binding).

As shown in 820, the input recipe may be compiled into a compiled recipe. The compiled recipe may include a directed acyclic graph of service operations linked by fields of data, where a field represents the output of one service operation and the input to another. The service operations may be provided by services that are loosely coupled and implemented according to a service-oriented architecture (SOA) in which services exchange requests and responses to perform complex operations. The service operations may be unordered in the input recipe, and in generating the compiled recipe, the recipe builder may determine an order of the flow of data between the service operations. A service operation may be associated with one or more required inputs, one or more optional inputs, and/or one or more optional outputs. Inputs and outputs may be strongly typed. The compiler may analyze the operations in the input recipe to determine the typed inputs and outputs. The compiler may then produce the directed acyclic graph of data flow between operations. The compiler may implement a set of rules and validations that prevent loops forming in the graph. The compiler may also implement a variety of other graph analysis rules to determine if other undesirable conditions are present and may fail the compilation process if so. Additionally, the compiler may implement rules to determine best practices and may issue warnings if violations are detected. The compiled recipe may also include a registry that stores instructions and metadata for invoking service calls, e.g., to control where and how services are invoked. In various embodiments, the registry may store information such as what endpoint to send input data for a service operation, how many connections to open to the endpoint, security parameters (e.g., Secure Sockets Layer information, authorization information, certifications, and so on), whether to do client-side load balancing, how many connections to open per-host for client-side load balancing, the timeout duration, whether to retry and with what strategy, and so on.

As shown in 830, a request may be received for the collaborative operation. The request may be from a customer for a customer-facing operation. As shown in 840, the compiled recipe may be selected for use in processing the request. In one embodiment, the recipe may be selected based (at least in part) on the identity of the customer. In one embodiment, the recipe may be selected based (at least in part) on one or more traits of the customer and/or request, such as the geographical location of the customer. In one embodiment, the recipe may be selected based (at least in part) on a recipe identifier specified with the request (e.g., as a parameter in a URL representing the request), e.g., to override any other basis for selecting the recipe.

As shown in 850, the request may be processed using the compiled recipe. The graph may be traversed to invoke service operations in an execution order that is determined at runtime. A service operation in the graph may be invoked only when its one or more inputs are ready, and so the order in which the graph is traversed may vary from request to request, dependent on the order in which services generate fields of data that are consumed by other services. Service operations may fill fields of data in a sheet associated with the request, and the sheet may be discarded after the request processing is complete. In one embodiment, some service calls may be delayed until a predetermined duration of time has passed since another service call was made.

Request Authorization Using Recipe-Based Coordination of Services

Figure 9:
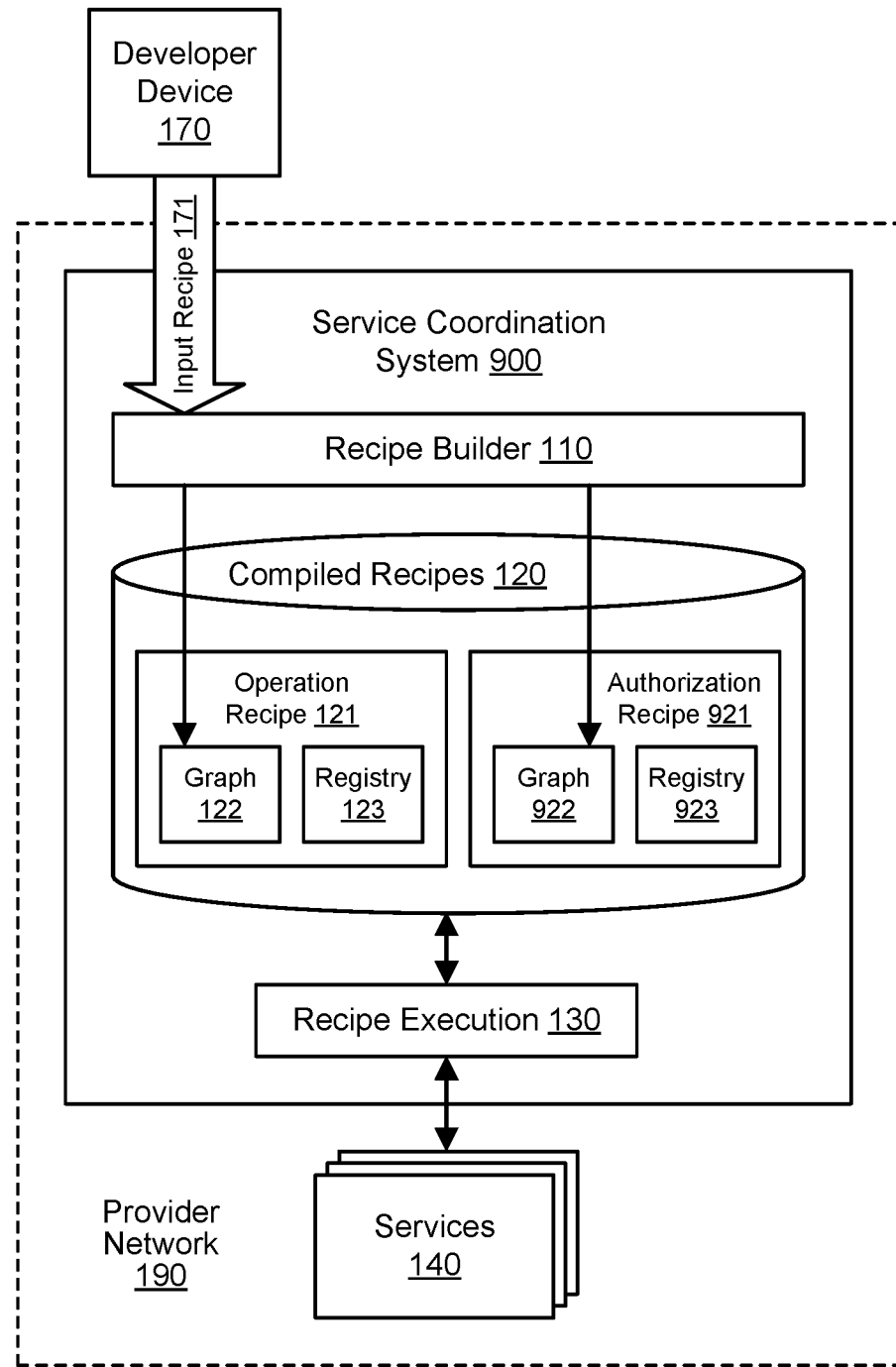
FIG. 9 illustrates an example system environment for request authorization using recipe-based coordination of services, including the use of a recipe builder component, according to one embodiment.

FIG. 9 illustrates an example system environment for request authorization using recipe-based coordination of services, including the use of a recipe builder component, according to one embodiment. A service coordination system 900 may include a recipe builder component 110 for building and maintaining recipes usable to perform collaborative operations in a service-oriented system and a recipe execution component 130 for processing requests for operations based on previously generated recipes. In one embodiment, the recipe execution component 130 may also be used to authorize requested operations. In one embodiment, a recipe 121 (also referred to as an operation recipe) may be executed for a given request only if prior authorization is successful using an authorization recipe 921.

To build an operation recipe 121 for an operation, a developer 170 may submit an input recipe 171 to the recipe builder 110. The recipe builder 110 may analyze the input recipe 171, compile the input recipe into a compiled recipe 121, and store the compiled recipe in a repository of recipes 120. In one embodiment, the recipe builder 110 may also be used to build the authorization recipe 921. In one embodiment, the authorization recipe 921 may be compiled automatically and programmatically based (at least in part) on the input recipe 171 and/or other input from the developer 170. For example, the recipe builder 110 may identify types of resources that may be associated with an operation (e.g., based on the input recipe 171) and may construct a graph 922 of service operations to generate descriptions of those resources and then evaluate one or more policies against the resource descriptions. In one embodiment, the authorization recipe 921 may instead be written manually (e.g., by the developer 170 or another developer) and submitted to the service coordination system 100 for storage in the repository of recipes 120. In one embodiment, the authorization recipe 921 may be automatically constructed based (at least in part) on a template and/or on analysis of the input recipe 171 and then manually modified by the developer 170. Using a computing device 170, a developer may enter suitable input using an interface to the service coordination system 900 to provide the authorization recipe 921 itself or information usable to compile the authorization recipe. The interface may include a graphical user interface (GUI), command-line interface (CLI), voice-enabled interface, touch-enabled interface, programmatic interface (e.g., an application programming interface), or any other suitable interface.

As discussed above, the input recipe 171 may indicate a set of service operations that the operation is expected to call. In one embodiment, the same set of service operations may be used to construct the authorization recipe 921. For example, the developer may add a "terminate volume" operation to the input recipe 171 for inclusion in the operation recipe 121. A service operation to generate a description of such a volume may be added to the authorization recipe 921 by the developer 170 or automatically by the recipe builder 110. The input recipe 171 may specify an input model for the operation, e.g., one or more named fields and their data type(s). The input recipe 171 may specify an output model for the operation, e.g., one or more named fields and their data type(s). The input recipe 171 may further specify any manual overrides to bindings of data fields to services, such that the developer specifies which output field from one operation is bound to which input field for another operation. For example, manual overrides may be used when two services use different names for the same data fields. For example, manual bindings may be used to rename fields, change types, or explicitly order operations via shadow fields. Using shadow fields, a false shadow output field may be bound to an operation, and that shadow field may be consumed as an optional input to another, thereby causing the second operation to block until the first operation has executed. Shadow fields may be expressed in the recipe as a binding (e.g., explicit field overrides on inputs and outputs) or as a declarative statement (e.g., a second operation follows a first operation, and the compiler generates the binding).

Using these inputs, the recipe builder 110 (also referred to herein as a compiler) may compile the information in the input recipe 171 into a directed acyclic graph 122 of service operations linked by fields of data, where a field represents the output of one service operation and the input to another. The service operations may be unordered in the input recipe 171, and in generating the compiled operation recipe 121, the recipe builder 110 may determine an order of the flow of data between the service operations. The recipe builder 110 may analyze the operations in the input recipe 171 to determine the typed inputs and outputs. The recipe builder 110 may then produce the directed acyclic graph 122 of data flow between operations. The recipe builder 110 may implement a set of rules and validations that prevent loops forming in the graph. The graph 122 may be automatically generated based (at least in part) on service definitions (including input and output models for the various service operations) and not necessarily using specific sequences or paths between service operations as specified by the developer. In various embodiments, the recipe builder 110 may generate a directed acyclic graph 922 for the authorization recipe 921 using similar techniques, or the graph 922 may be generated manually by a developer. In one embodiment, the authorization recipe 921 may be reviewed to ensure that it does not perform mutating operations.

The recipe builder 110 may also implement a variety of other graph analysis rules to determine if other undesirable conditions are present and may fail the compilation process if so. Additionally, the recipe builder 110 may implement rules to determine best practices and may issue warnings if violations are detected. The service operations in both recipes 121 and 921 may be associated with typed input fields (input data fields characterized by data types) and typed output fields (output data fields characterized by data types), and the flow of data may be determined based (at least in part) on correspondences between the typed input fields and the typed output fields of the service operations. For example, the recipe builder 110 may automatically determine that two operations are connected in the graph 122 or 922 if one operation produces a particular field (having a particular data type) as an output and another operation consumes that same field (with the same data type) as an input. As used herein, the term "automatically" indicates that a task can be performed to completion by an automated system without additional user input (after some initial configuration stage and/or instruction to begin).

The service operations in the graphs 122 and 922 may represent tasks performed by services 140. As discussed above, the services 140 may be loosely coupled and implemented according to a service-oriented architecture (SOA) in which services exchange requests and responses to perform complex operations. A system implemented according to the SOA may be referred to as a service-oriented system. In one embodiment, the services 140 may include one or more network-accessible services. The network-accessible services may accept requests (e.g., from other services) via a network (e.g., at an Internet-accessible and/or web address) and respond to the requests via the network. Functionality of the services 140 (e.g., service operations) may be requested via calls to application programming interfaces (APIs) or other programmatic interfaces. In various embodiments, the API calls may be performed over a secure proxy connection (e.g., one managed by a gateway control plane into the service and/or provider network), over a publicly accessible network (e.g., the Internet), or over a private channel such as a virtual private network (VPN) connection. The APIs may be implemented according to different technologies, including, but not limited to, Simple Object Access Protocol (SOAP) technology and Representational state transfer (REST) technology. For example, the APIs may be, but are not necessarily, implemented as SOAP APIs or RESTful APIs. SOAP represents a protocol for exchanging information in the context of network-based services. REST represents an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with a network-based data store or other system, service, component, or device.

A service operation in the authorization recipe 921 may be associated with one or more required inputs, optional inputs, and/or one or more optional outputs. Inputs and outputs may be strongly typed. A service operation in the authorization recipe 921 may be associated with a resource name or other identifier that uniquely identifies the operation within some context (e.g., a service-oriented system). In one embodiment, the combination of inputs, outputs, and resource name may be hashed to indicate a version of the corresponding service operation. The authorization recipe 921 may represent a directed acyclic graph 922 of possible paths through the service operations usable to authorize a request. In the graph 922, nodes may represent service operations and fields of data.

In one embodiment, the authorization recipe 921 may include a graph 922 and a registry 923. As discussed above, the graph 922 may connect service operations to fields, e.g., to control which services are invoked by the recipe execution component. The registry 923 may include instructions and metadata for invoking service calls, e.g., to control where and how services are invoked. In various embodiments, the registry 923 may store information such as what endpoint to send input data for a service operation, how many connections to open to the endpoint, security parameters (e.g., Secure Sockets Layer information, authorization information, certifications, and so on), whether to do client-side load balancing, how many connections to open per-host for client-side load balancing, the timeout duration, whether to retry and with what strategy, and so on. The identifier for a recipe 921 may be generated as a secure hash of both the graph 922 and the registry 923. In one embodiment, if the service-oriented system includes multiple independent regions (e.g., regions dictated by political and/or geographical boundaries), then the same recipe 921 may have registry information for the different regions.

In one embodiment, the recipe builder component 110 may support changes to recipes 120. Changes submitted by a developer 170 for an existing recipe may include new or different service operations, new or different inputs or outputs, new registry parameters such as service timeouts, and so on. In one embodiment, any such change may result in compilation of a new and immutable operation recipe 121 and/or authorization recipe 921. A new operation recipe 121 or authorization recipe 921 may be tested by directing only a limited amount of request traffic to it. In one embodiment, the recipe to be used for a request may be passed via the headers, e.g., with the parameter recipe=RECIPE_ID. In one embodiment, a recipe 121 and/or 921 may be automatically updated when any of its underlying service operations are changed. In one embodiment, the recipe builder 110 may obtain changes to underlying service operations, determine the compiled recipes that are potentially affected, and recompile the recipes to account for the changes in the service operations.

The service coordination system 900 may be implemented using one or more computing devices referred to as instances. Any of the instances may be implemented using the example computing device 3000 as shown in FIG. 15. In various embodiments, portions of the described functionality of the service coordination system 900 may be provided by the same computing device or by any suitable number of different computing devices. If any of the components of the service coordination system 900 are implemented using different computing devices, then the components and their respective computing devices may be communicatively coupled, e.g., via a network. Each of the illustrated components may represent any combination of software and hardware usable to perform their respective functions. The service coordination system 900 and/or services 140 may be implemented using resources of a provider network 190, as discussed above with respect to FIG. 1. It is contemplated that the service coordination system 100 may include additional components not shown, fewer components than shown, or different combinations, configurations, or quantities of the components shown.

Figure 10:
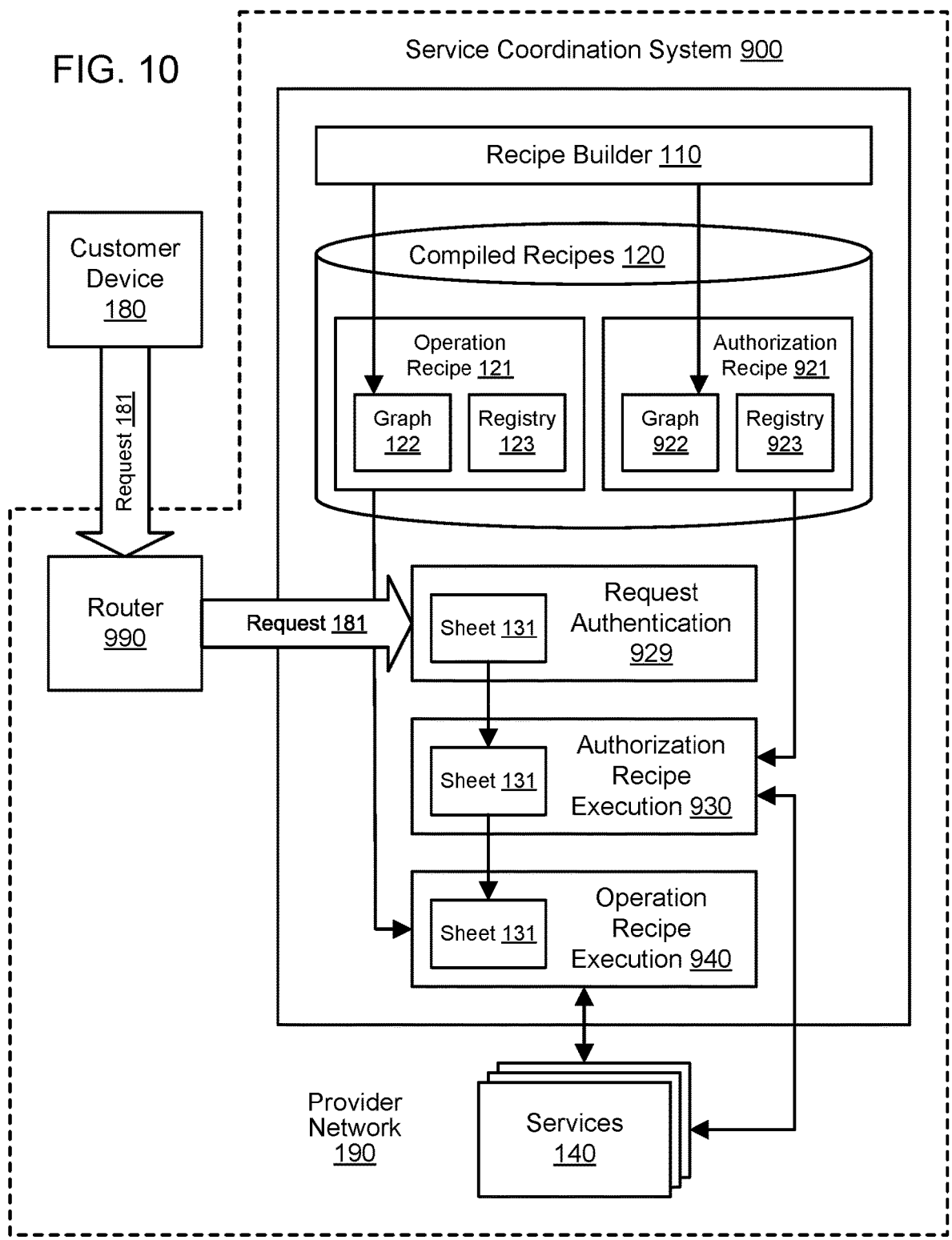
FIG. 10 illustrates further aspects of the example system environment for request authorization using recipe-based coordination of services, including the use of a recipe execution component, according to one embodiment.

FIG. 10 illustrates further aspects of the example system environment for request authorization using recipe-based coordination of services, including the use of a recipe execution component, according to one embodiment. The recipe execution component 130 may implement different stages such as authorization recipe execution 930 and operation recipe execution 940. The stages of the recipe execution component 130 may also be referred to as a runtime stages, and tasks performed in the authorization and execution of a request 181 may be referred to as taking place at runtime. Using a computing device 180, a customer of the provider network 190 may provide a request 181 for the operation associated with the operation recipe 121. The operation may be termed a customer-facing operation such that customers of the provider network 190 may request the operation. The customer may represent an internal user of the provider network 190 (including the services 140) or an entity external to the provider network. The customer device 180 may be implemented using the example computing device 3000 as shown in FIG. 15. The request 181 may be provided to the service coordination system 900 via one or more networks, as discussed above with respect to FIG. 9. For example, the request 181 may be received by a component of the provider network 190 in the form of a uniform resource locator (URL) sent by a web browser. The request 181 may be received from the customer 180 by a router 990 or one or more other components associated with the provider network 190, e.g., one or more web servers, proxies, load balancers, and so on.

In one embodiment, a sheet 131 of data may be used in the processing of a given request 181. In one embodiment, a sheet is a data structure that includes fields of data that can be filled by service operations. The sheet 131 may represent the progress of the request 181. In one embodiment, a sheet may be ephemeral and may be discarded after the processing of the request is complete. The service coordination system 900 may store (temporarily, in memory) the sheet 131 representing the customer's request and its progress, and the service coordination system 900 may allow for annotation of request metadata (e.g., properties, resource identifiers, capacity instructions, placement data, and so on) that independent services may require in order to fulfill their portion of a request. As the request is processed, services may write additional fields to the sheet. The stages of the recipe execution component 130 may provide an abstract data access and update API so that called services can modify sheets. In one embodiment, default metadata may be added to a sheet such as encrypted fabric-attached storage, user-agent, credential store properties, source IPs, API version, endpoints, request-id, and so on. In one embodiment, a sheet 131 associated with a particular request 181 (or portions of the sheet, such as particular fields of data) may be re-used from one stage of request processing to another, e.g., from request authentication 929 to authorization recipe execution 930 and/or from authorization recipe execution 930 to operation recipe execution 940. By re-using all or part of a sheet from one stage to another, the service coordination system 900 may process requests more efficiently (e.g., without having to generate the same data twice) and also more securely.

In one embodiment, the request 181 may be received by a router that performs request authentication 929. The request authentication 929 may determine whether the request is valid, e.g., whether it actually originates from the customer 180. The request authentication 929 may attempt to verify that the request is properly signed with the customer's signature. If the request authentication 929 fails to authenticate the request 181, the request may be discarded without attempting to authorize or perform the requested operation, and an appropriate response indicating the failure may be returned to the customer 180. The request authentication 929 may identify one or more policies that are applicable to the request 181. In one embodiment, policies may be identified based (at least in part) on the identity of the user associated with the request, a group to which the user belongs, the region in which the request was issued, and/or other user traits or suitable criteria. Accordingly, request authentication 929 may also determine the identity of the customer 180 so that relevant policies may be identified. Policies may involve permissible usage of resources, e.g., to restrict read and/or write access on behalf of customers to particular types of resources. For example, a policy may indicate that users within a particular department of an organization may read or write only to storage volumes that are tagged with a particular alphanumeric label (a tag) associated with their department. As another example, a policy may permit a particular user to terminate only compute instances having at least one volume that is tagged to a particular department. As further examples, a policy may permit a user to perform actions only against instances of a particular size, or resources in particular zones, or instances that have particular types of licenses. In one embodiment, the customer identity and/or one or more policies may be written to the sheet 131 associated with the request 181.

When the request 181 for the operation is received, an authorization recipe 921 associated with the requested operation may be selected, e.g., by the router in which the request authentication 929 is performed. Similarly, an operation recipe 121 associated with the requested operation may be selected, e.g., by the router in which the request authentication 929 is performed. In one embodiment, two or more authentication recipes and/or two or more operation recipes associated with the same operation may be deployed simultaneously, and a selection of the available recipes may be performed at runtime when a request is received. Different recipes may be linked to different customers, different regions, different compute environments (e.g., a production environment vs. a test environment), and so on. In one embodiment, the operation recipe 121 or authentication recipe 921 may be selected based (at least in part) on the identity of the customer 180. In one embodiment, the operation recipe 121 or authentication recipe 921 may be selected based (at least in part) on one or more traits of the customer 180 and/or request 181, such as the geographical location or identity of the customer. In one embodiment, the operation recipe 121 or authentication recipe 921 may be selected based (at least in part) on a recipe identifier specified with the request 181 (e.g., as a parameter in a uniform resource locator (URL) representing the request), e.g., to override any other basis for selecting the recipe. In one embodiment, the same operation recipe 121 or authentication recipe 921 may be used for all or nearly all requests for the corresponding operation, e.g., unless a different recipe is specified with the request.

If the request 181 is authenticated successfully, then authorization recipe execution 930 may be initiated using the selected authentication recipe 921. The execution order in which service operations in the recipe 921 are invoked may be determined at runtime. A service operation in the graph 922 may be invoked only when its one or more inputs are ready, and so the order in which the graph is traversed may vary from request to request, dependent on the order in which services generate fields of data that are consumed by other services. Service operations may fill fields of data in a sheet 131. For example, the authorization recipe 921 may invoke service operations that describe resources such as compute instances, machine images, storage volumes, and so on. The resource descriptions generated as output fields of such service operations may be written to the sheet 131 and then re-used in the operation recipe execution 940.

If the request 181 is authorized successfully, then operation recipe execution 940 may be initiated using the selected operation recipe 121. The execution order in which service operations in the recipe 121 are invoked may be determined at runtime. A service operation in the graph 122 may be invoked only when its one or more inputs are ready, and so the order in which the graph is traversed may vary from request to request, dependent on the order in which services generate fields of data that are consumed by other services. Service operations may fill fields of data in a sheet 131. The sheet may be discarded after the request processing is complete, e.g., upon successful completion of the operation recipe 121 or failure of the request 181 at any stage.

The stages of the recipe execution component 130 may invoke various services 140 based on traversal of the graph 122 and/or graph 922 during the processing of the request 181. As discussed above with respect to FIG. 2B, the services 140 may include various types of services that are implemented in different ways in the provider network 190. For example, instances of some of the services 140 may be implemented using corresponding compute instances. These instances may represent endpoints that can be contacted by the recipe execution component 130 to invoke operations offered by the resident services. In one embodiment, such services 140 may be accessible via load balancers. The services 140 may also include a task execution service 140M, such as Amazon Lambda, that offers a "serverless" compute platform in which compute resources are managed internally by the service itself for execution of tasks supplied by clients (including the recipe execution component 130). The task execution service may be used to implement one or more service operations that are invoked by the recipe execution component 130. Additionally, the services 140 may include a container service, such as Amazon EC2 Container Service (ECS), that offers API-based launching of containerized applications on a managed cluster of virtual compute instances in the provider network 190. The container service may be used to implement one or more service operations that are invoked by the recipe execution component 130.

Figure 11:
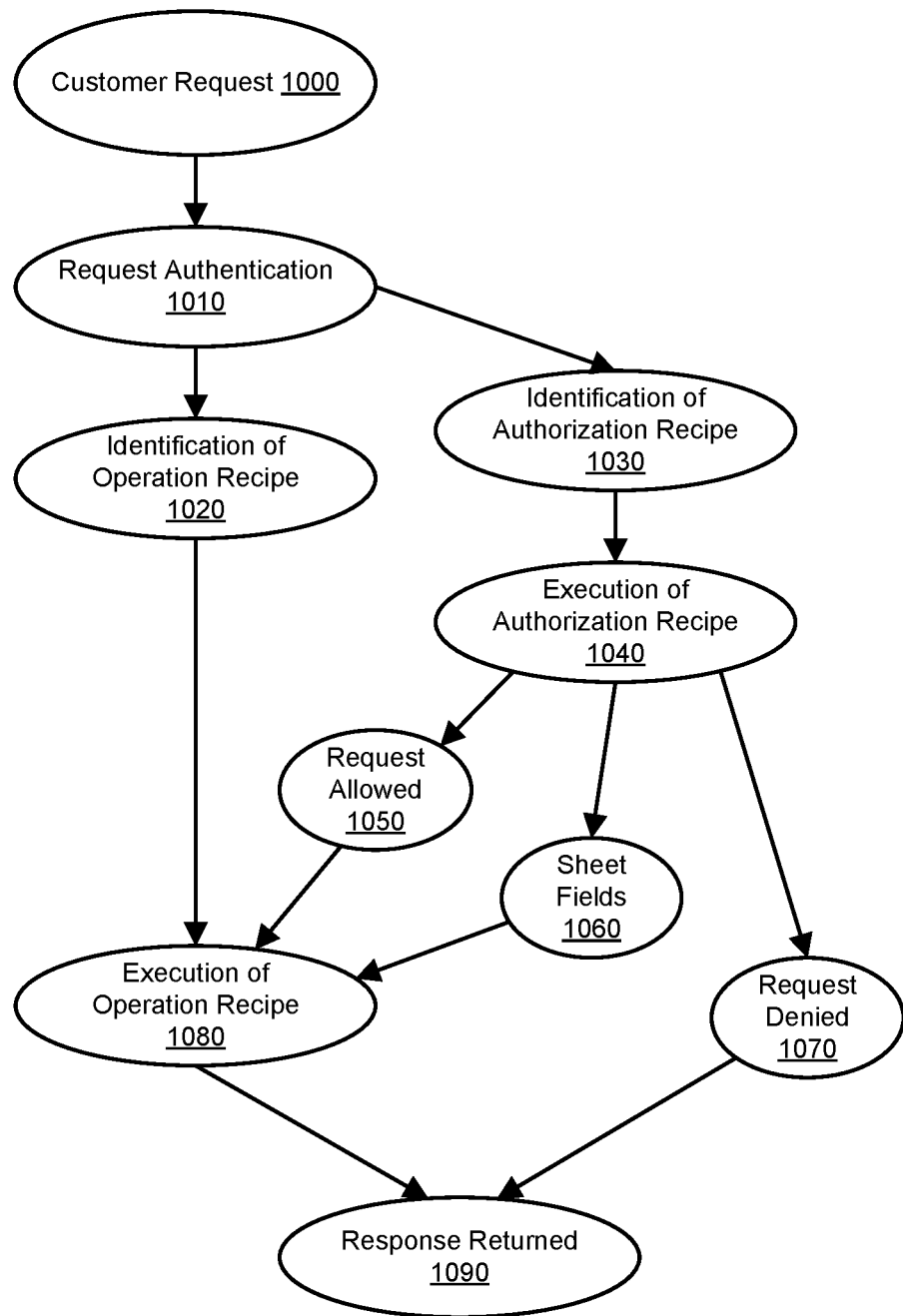
FIG. 11 illustrates an example of an operation flow for request authorization using recipe-based coordination of services, according to one embodiment.

FIG. 11 illustrates an example of an operation flow for request authorization using recipe-based coordination of services, according to one embodiment. In a first node 1000, a customer request is received. The customer request may be passed to a request authentication operation 1010. If the authentication is successful, then appropriate fields of data may be passed to an operation 1020 to identify the operation recipe for the request and also to an operation 1030 to identify the authorization recipe for the request. Execution of the authorization recipe may be performed in the operation 1040. Output of the authorization operation 1040 may include allowing the request to proceed as shown in 1050 or denying further processing of the request as shown in 1070. Additionally, the authorization 1040 may produce one or more sheet fields 1060 as output. For example, the sheet fields may include descriptions of one or more resources. If the request is authorized, then the flow may proceed to execution of the operation recipe as shown in 1080. The execution of the operation recipe 1080 may use the one or more sheet fields produced by the authorization recipe. Upon successful or failed processing of the operation recipe 1080, an appropriate response may be returned to the customer as indicated in 1090.

Figure 12:
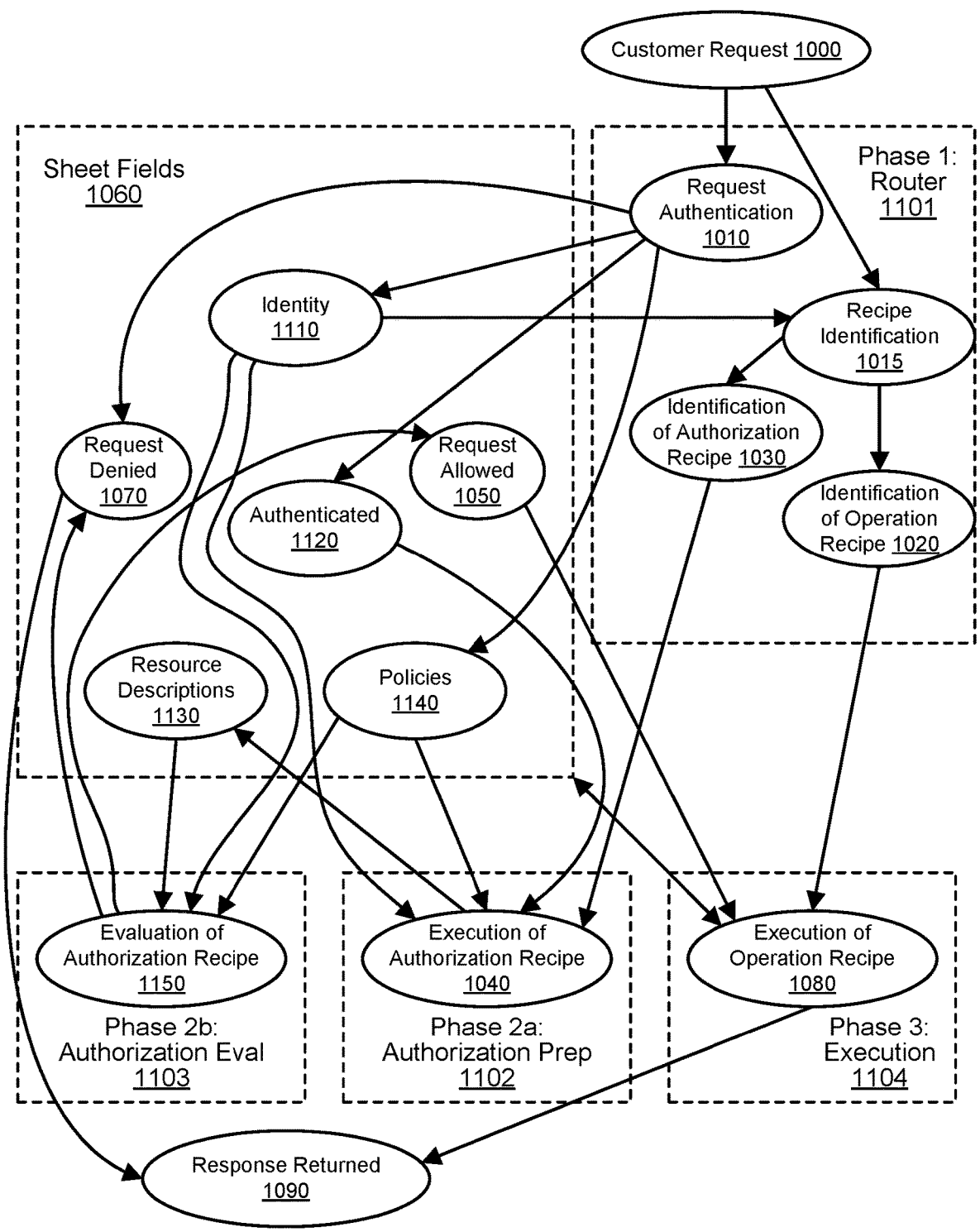
FIG. 12 illustrates an example of an operation flow for request authorization using recipe-based coordination of services, according to one embodiment.

FIG. 12 illustrates an example of an operation flow for request authorization using recipe-based coordination of services, according to one embodiment. The flow shown in FIG. 12 may represent a more detailed version of the flow shown in FIG. 11. In a first node 1000, a customer request is received. The customer request may be passed to a request authentication operation 1010, e.g., as performed at a router or other edge location. The request authentication 1010 may verify that the request originated from the customer. The request authentication 1010 may also complete one or more fields 1060 in a sheet associated with the request. The sheet fields 1060 may be held in memory (e.g., at an instance of the service coordination system 900) and discarded after processing of the request is completed. In one embodiment, the request authentication 1010 may determine an identity 1110 of the customer associated with the request 1000. The customer's identity 1110 may be determined with respect to an identity and access management system of the provider network 190. In one embodiment, the request authentication 1010 may determine one or more policies 1140 that are applicable to the request. For example, the policies 1140 may be determined based (at least in part) on the identity 1110 of the customer. In one embodiment, the request authentication 1010 may complete a request denied field 1070 (e.g., with a Boolean value) if the request could not be authenticated, and otherwise the request authentication 1010 may complete an authenticated field 1120 (e.g., with a Boolean value).

If the authentication 1010 is successful (as indicated in the authenticated field 1120), then appropriate sheet fields 1060 may be passed or otherwise made available to a recipe identification operation 1015. The recipe identification 1015 may produce an identification 1030 of an authorization recipe for the request and also an identification 1020 of an operation recipe for the request. In one embodiment, the authorization recipe and/or operation recipe may be determined based (at least in part) on aspects of the request 1000 and/or on the sheet fields 1060, such as the identity 1110 of the customer. The request authentication 1010 and recipe identification 1015 may be performed in a first phase 1101 of request processing, e.g., as implemented at a router.

In a second phase of request processing, execution of the authorization recipe may be initiated in the operation 1040, and the recipe may be evaluated as shown in 1150. The execution of the authorization recipe 1040 may consume one or more sheet fields 1060, such as the customer identity 1110, the applicable policies 1140, and the indication of successful authentication 1120. The execution of the authorization recipe 1040 may complete one or more sheet fields, such as one or more resource descriptions 1130. The service operations invoked in the authorization recipe may generate such resource descriptions. For example, the authorization recipe may include the describe machine image operation 310 and/or describe instance type operation 320 as shown in FIG. 3. By implementing the describe machine image operation 310 and/or describe instance type operation 320 in the authorization phase and writing the output to the sheet fields 1060, the same operations 310 and 320 may not need to be called again in the execution of the operation recipe.

The execution of the authorization recipe as shown in 1040 may take place in a first part 1102 of the second phase that represents authorization preparation. The evaluation of the authorization recipe as shown in 1150 may take place in a second part 1103 of the second phase that represents authorization evaluation. The evaluation of the authorization recipe 1150 may consume one or more sheet fields 1060, such as the customer identity 1110, the applicable policies 1140, and the resource descriptions 1130. The evaluation of the authorization recipe 1040 may complete one or more sheet fields 1060, such as an indication of whether the request is denied 1070 or allowed 1050 based on the evaluation of the policies 1140 against the customer identity 1110 and resource descriptions 1130. For example, if the policies 1140 indicate that the customer having the identity 1110 may perform the requested operation requiring read or write access to one or more resources having the descriptions 1130, then the evaluation 1150 may indicate that the request is allowed 1050; if the policies dictate that the customer may not perform the requested operation against such resources, then the evaluation 1150 may indicate that the request is denied 1070.

In a third phase 1104 of request processing, if the request is authorized, then the flow may proceed to execution of the operation recipe as shown in 1080. The execution of the operation recipe 1080 may use one or more sheet fields 1060 produced by the authorization recipe. By invoking service operations to generate the resource descriptions 1130 in the authorization phase and writing the output to the sheet fields 1060, the same operations may not need to be called again in the execution of the operation recipe. Additionally, the operation recipe may be executed against those resource descriptions 1130 for further security. For example, if the request involves modifying a set of volumes, and a new volume is added to the set of volumes after the resource descriptions 1130 are generated during authorization, then the request may be performed against the older set of volumes and not the newly added volume. Similarly, decisions made concerning resource usage in the authorization phase may be carried over to the execution phase via the resource descriptions 1130. For example, in the authorization phase, resources may be selected in a particular zone based (at least in part) on the customer having authorized access to that zone and not to other zones; those resources may then be acted upon in the execution of the operation recipe. Upon successful or failed processing of the operation recipe 1080, an appropriate response may be returned to the customer as indicated in 1090.

Figure 13:
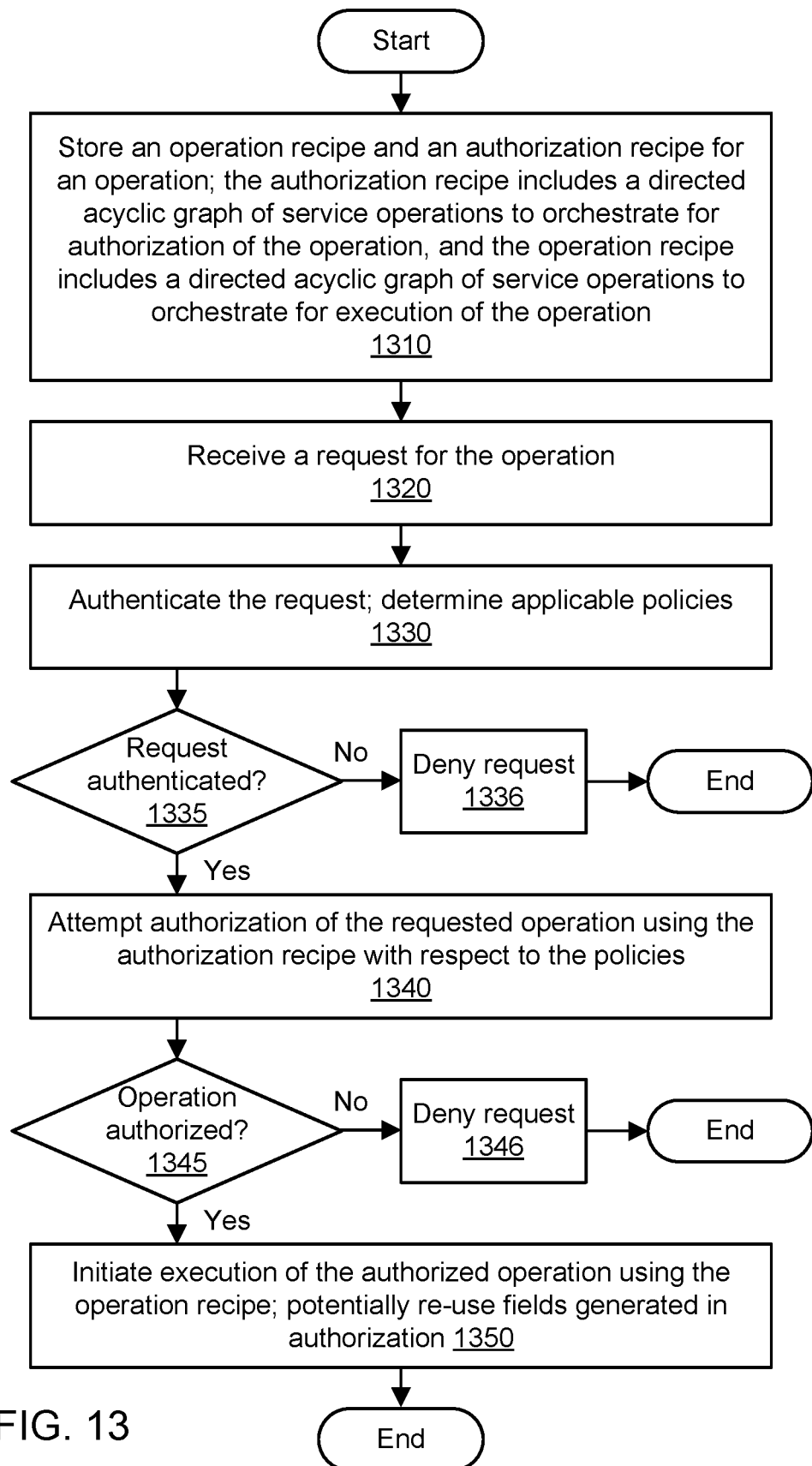
FIG. 13 is a flowchart illustrating a method for request authorization using recipe-based coordination of services, according to one embodiment.

FIG. 13 is a flowchart illustrating a method for request authorization using recipe-based coordination of services, according to one embodiment. As shown in 1310, an operation recipe and an authorization recipe associated with an operation may be stored. The authorization recipe may include a directed acyclic graph of service operations to orchestrate for authorization of the operation. For example, the service operations in the authorization recipe may include one or more service operations to generate descriptions of resources (e.g., compute instances, storage resources, and so on) and to evaluate policies in light of those resources. Similarly, the operation recipe may include a directed acyclic graph of service operations to orchestrate for execution of the operation. In various embodiments, the authorization recipe or operation recipe may be generated manually (e.g., as written by a developer) or automatically (e.g., by a recipe builder component).

As shown in 1320, a request for the operation may be received. As shown in 1330, authentication of the request may be attempted. Authentication may include verifying that the request originated from a particular customer. Authentication may also include determining the identity of the customer and determining one or more applicable policies (e.g., based at least in part on the customer's identity). For example, policies may describe permissible resource usage. As shown in 1335, if the request is not authenticated, then the method may proceed to denial of the request as shown in 1336. If the request is authenticated, then the method may proceed to an authorization stage.

As shown in 1340, authorization of the requested operation may be attempted. The authorization may be initiated using the authorization recipe previously stored. The authorization recipe may be selected based on any suitable criteria, potentially including the identity of the customer or other fields determined in the authentication stage. Traversal of the graph in the authorization recipe may include invoking service operations in an order determined at runtime, e.g., based on availability of inputs to the service operations. The authorization to proceed with the requested operation may take into account the customer's identity and the one or more policies applicable to the request. The authorization may generate one or more resource descriptions (e.g., of computing resources or storage resources in a provider network), and the policies may be evaluated in view of the resource descriptions and the customer's identity. For example, the authorization may determine whether the applicable policies permit the customer to read a particular storage resource, modify a particular storage resource, create a new volume, and so on, if the requested operation would require such access privileges. As shown in 1345, if the request is not authorized, then the method may proceed to denial of the request as shown in 1346. If the request is authorized, then the method may proceed to an execution stage.

As shown in 1350, execution of the authorized operation may be initiated using the operation recipe. The operation recipe may be selected based on any suitable criteria, potentially including the identity of the customer or other fields determined in the authentication stage. Traversal of the graph in the operation recipe may include invoking service operations in an order determined at runtime, e.g., based on availability of inputs to the service operations. In one embodiment, one or more fields of data (e.g., in a sheet associated with the request) may be passed from the authorization stage to the execution stage. In this manner, the same operations (e.g., to generate resource descriptions) may not need to be called again in the execution of the operation recipe. Additionally, the operation recipe may be executed against the context indicated in those resource descriptions.

Figure 14:
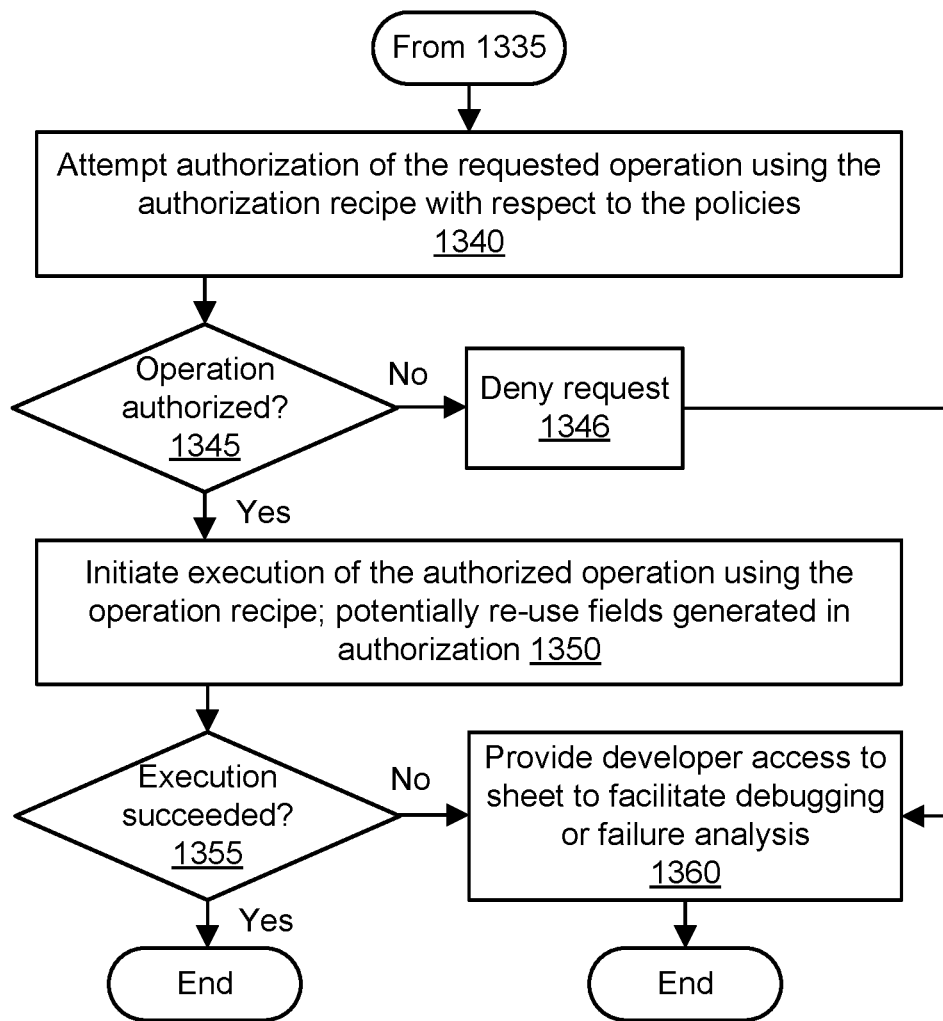
FIG. 14 is a flowchart illustrating further aspects of the method for request authorization using recipe-based coordination of services, including the use of a sheet for debugging or failure analysis, according to one embodiment.

FIG. 14 is a flowchart illustrating further aspects of the method for request authorization using recipe-based coordination of services, including the use of a sheet for debugging or failure analysis, according to one embodiment. As discussed above with respect to FIG. 13, as shown in 1340, authorization of the requested operation may be attempted. Authorization may fill one or more fields of data in a sheet associated with the request. For example, the authorization may generate one or more resource descriptions (e.g., of computing resources or storage resources in a provider network). As shown in 1345, if the request is not authorized, then the method may proceed to denial of the request as shown in 1346. If the request is authorized, then the method may proceed to an execution stage. As shown in 1350, execution of the authorized operation may be initiated using the operation recipe. As shown in 1355, the method may end (with a response returned to the customer) if the execution is successfully completed.

In some circumstances, the sheet may be held in memory on a temporary basis and may be discarded shortly after the processing of the request has completed. In other circumstances, the sheet may be transferred to persistent storage for later review and analysis. As shown in 1360, if the authorization or execution of the operation failed, then the sheet (including any fields generated throughout the processing of the corresponding request) may be made available to a suitable developer. The sheet (or portions thereof) may be sent to the developer, or the developer may be granted access to the sheet in a management console associated with the service coordination system 900 or provider network 190. The developer may be associated with the operation recipe and/or authorization recipe. Using the sheet, the developer may perform debugging or failure analysis of the failed authorization or failed execution. For example, the developer may use the contents of fields in the sheet to ascertain that one or more service calls failed to produce output in the sheet, that the recipe itself was improperly constructed, that the execution was halted by a network failure, and so on. In one embodiment, the developer may modify the authorization recipe and/or operation recipe based on such analysis.

Illustrative Computer System

In at least some embodiments, a computer system that implements a portion or all of one or more of the technologies described herein may include a computer system that includes or is configured to access one or more computer-readable media. FIG. 15 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a service coordination system, wherein the service coordination system is implemented using at least one processor and a memory storing program instructions, and wherein the program instructions are executable by the at least one processor to:
receive a request for an operation;
identify, from a recipe repository, an authorization recipe and an operation recipe for the operation, wherein the authorization recipe comprises a first directed acyclic graph of first service operations representing a first flow of data between the first service operations to be used to authorize the operation, and wherein the operation recipe comprises a second directed acyclic graph of second service operations representing a second flow of data between the second service operations to be used to execute the operation;
attempt the authorization of the operation according to the authorization recipe, wherein the program instructions are executable by the at least one processor to invoke one or more of the first service operations to attempt to authorize the operation and to generate one or more fields of data; and
if the authorization of the operation is successful, initiate the execution of the operation according to the operation recipe, wherein the program instructions are executable by the at least one processor to invoke one or more of the second service operations to execute the operation using the one or more fields of data.

2. The system as recited in claim 1, wherein, in attempting the authorization of the operation according to the authorization recipe, the program instructions are executable by the at least one processor to:
generate a description of one or more resources associated with the operation.

3. The system as recited in claim 1, wherein the program instructions are executable by the at least one processor to:
determine a cause of failed authorization or failed execution based at least in part on the one or more fields of data.

4. The system as recited in claim 1, wherein the program instructions are executable by the at least one processor to:
select one or more policies based at least in part on an identity of a user issuing the request, wherein at least some of the one or more policies describe permissible resource usage; and
wherein, in attempting the authorization of the operation according to the authorization recipe, the program instructions are executable by the at least one processor to:
evaluate the one or more policies associated with the request.

5. A computer-implemented method, comprising:
receiving a request for an operation;
selecting, from a recipe repository storing data structures representing recipes, an authorization data structure and an operation data structure for the operation, wherein the authorization data structure comprises a first directed acyclic graph of first service operations representing a first flow of data between the first service operations to be used to authorize the operation, and wherein the operation data structure comprises a second directed acyclic graph of second service operations representing a second flow of data between the second service operations to be used to execute the operation;
attempting the authorization of the operation according to the authorization data structure, comprising invoking one or more of the first service operations to attempt to authorize the operation; and
initiating the execution of the operation according to the operation data structure based at least in part on a successful result of the authorization, comprising invoking one or more of the second service operations to execute the operation.

6. The method as recited in claim 5, wherein attempting the authorization of the operation according to the authorization data structure comprises:
generating a description of one or more resources associated with the operation.

7. The method as recited in claim 6, wherein the execution of the operation according to the operation data structure is performed using the description of the one or more resources.

8. The method as recited in claim 5, wherein at least some of the first service operations to be used to authorize the operation comprise service operations executable to generate a description of one or more resources associated with the operation.

9. The method as recited in claim 5, wherein attempting the authorization of the operation according to the authorization data structure comprises:
evaluating one or more policies associated with the request, wherein at least some of the one or more policies describe permissible resource usage.

10. The method as recited in claim 9, further comprising:
selecting the one or more policies based at least in part on an identity of a user issuing the request.

11. The method as recited in claim 5, wherein attempting the authorization of the operation according to the authorization data structure comprises:
generating one or more fields of data, wherein the one or more fields of data are used in the execution of the operation according to the operation recipe.

12. The method as recited in claim 11, further comprising:
determining a cause of failed authorization or failed execution based at least in part on the one or more fields of data.

13. The method as recited in claim 5, wherein the execution of the operation according to the operation data structure is initiated if the authorization is successful, and wherein the method further comprises:
if the authorization is unsuccessful, denying the request without initiating the execution of the operation according to the operation data structure.

14. The method as recited in claim 5, wherein the first directed acyclic graph is traversed based at least in part on an availability of inputs to individual ones of the first service operations.

15. A computer-readable storage medium storing program instructions that, if executed, perform:
receiving a request for an operation;
selecting, from a recipe repository, an authorization recipe and an operation recipe for the operation, wherein the authorization recipe comprises a first directed acyclic graph of first service operations representing a first flow of data between the first service operations to be used to authorize the operation, and wherein the operation recipe comprises a second directed acyclic graph of second service operations representing a second flow of data between the second service operations to be used to execute the operation;

attempting the authorization of the operation according to the authorization recipe, comprising invoking one or more of the first service operations to attempt to authorize the operation; and initiating the execution of the operation according to the operation recipe based at least in part on a successful result of the authorization, comprising invoking one or more of the second service operations to execute the operation.

16. The computer-readable storage medium as recited in claim 15, wherein attempting the authorization of the operation according to the authorization recipe comprises:

generating a description of one or more resources associated with the operation, wherein the execution of the operation according to the operation recipe is performed using the description of the one or more resources.

17. The computer-readable storage medium as recited in claim 15, wherein attempting the authorization of the operation according to the authorization recipe comprises:

evaluating one or more policies associated with the request, wherein at least some of the one or more policies describe permissible resource usage.

18. The computer-readable storage medium as recited in claim 17, wherein the program instructions are further computer-executable to perform:

selecting the one or more policies based at least in part on an identity of a user issuing the request.

19. The computer-readable storage medium as recited in claim 15, wherein attempting the authorization of the operation according to the authorization recipe comprises:

generating one or more fields of data, wherein the one or more fields of data are used in the execution of the operation according to the operation recipe.

20. The computer-readable storage medium as recited in claim 15, wherein the execution of the operation according to the operation recipe is initiated if the authorization is successful, and wherein the program instructions are further computer-executable to perform:

if the authorization is unsuccessful, denying the request without initiating the execution of the operation according to the operation recipe.

* * * * *